US012592577B2

(12) United States Patent  (10) Patent No.: US 12,592,577 B2
Noller et al.  (45) Date of Patent: Mar. 31, 2026

(54) BATTERY MANAGEMENT SYSTEM FOR BATTERY POWERED EQUIPMENT

(71) Applicant: Briggs & Stratton, LLC, Wauwatosa, WI (US)

(72) Inventors: Mark Noller, Milwaukee, WI (US); Todd Johnson, Wauwatosa, WI (US)

(73) Assignee: Briggs & Stratton, LLC, Wautwatosa, WI (US)

( * ) Notice: Subject to any disclaimer, the term of this patent is extended or adjusted under 35 U.S.C. 154(b) by 931 days.

(21) Appl. No.: 17/792,086

(22) PCT Filed: Jan. 12, 2021

(86) PCT No.: PCT/IB2021/050197
§ 371 (c)(1),
(2) Date: Jul. 11, 2022

(87) PCT Pub. No.: WO2021/144693
PCT Pub. Date: Jul. 22, 2021

(65) Prior Publication Data
US 2023/0051999 A1 Feb. 16, 2023

Related U.S. Application Data

(60) Provisional application No. 62/960,549, filed on Jan. 13, 2020.

(51) Int. Cl.
*H02J 7/00* (2006.01)
*H01M 10/42* (2006.01)
(Continued)

(52) U.S. Cl.
CPC ..... *H02J 7/007188* (2020.01); *H01M 10/425* (2013.01); *H01M 10/482* (2013.01);
(Continued)

(58) Field of Classification Search
CPC ............. H02J 7/007188; H02J 7/00032; H02J 7/0047; H01M 50/296; H01M 50/204;
(Continued)

(56) References Cited

U.S. PATENT DOCUMENTS

| | | | | |
|---|---|---|---|---|
| 8,367,235 B2 * | 2/2013 | Huang | ................ | H04M 1/0262 |
| | | | | 429/188 |
| 9,437,850 B2 * | 9/2016 | Brockman | .......... | H01M 10/486 |

(Continued)

OTHER PUBLICATIONS

International Search Report and Written Opinion regarding PCT Application No. PCT/IB2021/050197 Dtd May 25, 2021, 10 pps.

*Primary Examiner* — Zhen Y Wu
(74) *Attorney, Agent, or Firm* — Foley & Lardner LLP

(57) ABSTRACT

A battery pack includes a housing, a plurality of rechargeable battery cells, a connection interface, a near-field communication (NFC) reader, a battery management system, and a communication gateway. The connection interface is in communication includes a plurality of data pins, a positive terminal, and a negative terminal. The battery management system is in communication with the NFC reader and is configured to receive information from the NFC reader including an NFC tag identification, then retrieve stored parameters corresponding to the NFC tag identification, and configure at least one of the plurality of data pins based upon the stored parameters corresponding to the NFC tag identification.

20 Claims, 21 Drawing Sheets

(51) Int. Cl.

| | |
|---|---|
| *H01M 10/48* | (2006.01) |
| *H01M 50/204* | (2021.01) |
| *H01M 50/296* | (2021.01) |
| *H04B 5/77* | (2024.01) |

(52) U.S. Cl.
CPC ....... *H01M 50/204* (2021.01); *H01M 50/296*
(2021.01); *H02J 7/00032* (2020.01); *H02J*
*7/0047* (2013.01); *H01M 2010/4271* (2013.01);
*H01M 2010/4278* (2013.01); *H01M 2220/20*
(2013.01); *H01M 2220/30* (2013.01); *H04B*
*5/77* (2024.01)

(58) Field of Classification Search
CPC ............. H01M 10/425; H01M 10/482; H01M
2010/4271; H01M 2010/4278; H01M
2220/20; H01M 2220/30; H04B 5/77
USPC ........................................................ 702/63

See application file for complete search history.

(56) References Cited

U.S. PATENT DOCUMENTS

| | | | | |
|---|---|---|---|---|
| 9,446,680 | B2 * | 9/2016 | Chen .................... | H02J 7/00043 |
| 10,440,542 | B2 * | 10/2019 | Thomas .................. | H04W 4/80 |
| 11,165,104 | B2 * | 11/2021 | Funk ................. | H01M 10/4207 |
| 11,316,211 | B2 * | 4/2022 | Morris ..................... | H02J 7/00 |
| 2007/0155443 | A1 | 7/2007 | Cheon et al. | |
| 2009/0186264 | A1 | 7/2009 | Huang | |
| 2013/0164567 | A1 | 6/2013 | Olsson et al. | |
| 2014/0155125 | A1 * | 6/2014 | Thill .................. | H04M 1/0262 |
| | | | | 455/572 |
| 2014/0232326 | A1 * | 8/2014 | Wohltmann ...... | H02J 7/007182 |
| | | | | 320/107 |
| 2015/0318582 | A1 * | 11/2015 | Brockman .......... | H01M 10/425 |
| | | | | 320/137 |
| 2016/0087314 | A1 | 3/2016 | Arashima et al. | |
| 2016/0096444 | A1 * | 4/2016 | Chen .................... | H02J 7/00043 |
| | | | | 701/22 |
| 2017/0144562 | A1 * | 5/2017 | Thomas ........... | H01M 10/4257 |
| 2019/0067751 | A1 * | 2/2019 | Funk ................... | H01M 50/267 |
| 2019/0075724 | A1 | 3/2019 | Becke et al. | |
| 2020/0058963 | A1 * | 2/2020 | Morris ............... | H02J 7/00043 |
| 2020/0393516 | A1 * | 12/2020 | Gao ..................... | G01R 31/371 |
| 2021/0159713 | A1 * | 5/2021 | Baarman ............. | H02J 7/00036 |

* cited by examiner

110

405

415

410

BATTERY MANAGEMENT SYSTEM FOR BATTERY POWERED EQUIPMENT

CROSS-REFERENCE TO RELATED APPLICATION

This Application is a National Stage Application of PCT Application No. PCT/IB2021/050197, filed on Jan. 12, 2021, which claims the benefit of U.S. Provisional Patent Application No. 62/960,549, filed Jan. 13, 2020, both of which are hereby incorporated herein by reference in their entireties.

BACKGROUND

The present invention generally relates to the field of indoor and outdoor power equipment, and in particular, to the field of battery powered indoor and outdoor power equipment.

SUMMARY

A battery pack is disclosed, according to an exemplary embodiment. The battery pack includes a housing, a plurality of rechargeable battery cells positioned within the housing, a connection interface, a near-field communication (NFC) reader, a battery management system, and a communication gateway. The connection interface is in communication with the plurality of rechargeable battery cells, and includes a plurality of data pins, a positive terminal, and a negative terminal. The NFC reader is positioned within the housing. The battery management system is in communication with the NFC reader and is configured to receive information from the NFC reader including an NFC tag identification. The battery management system is further configured to then retrieve stored parameters corresponding to the NFC tag identification (e.g., from a local or remote memory) and then configure at least one of the plurality of data pins based upon the stored parameters corresponding to the NFC tag identification. The communication gateway is in communication with the battery management system, and is configured to receive and transmit information via a communication protocol having a frequency exceeding 14 MHz. The battery management system is configured to monitor operational parameters of the rechargeable battery cells and data received through the plurality of data pins and transmit operational parameters of the rechargeable battery cells and data received through the plurality of data pins over the communication protocol.

A battery pack is disclosed, according to another exemplary embodiment. The battery pack includes a housing, a plurality of rechargeable battery cells positioned within the housing, a connection interface, a near-field communication (NFC) reader, a battery management system, and a communication gateway. The connection interface is in communication with the plurality of rechargeable battery cells. The connection interface includes an electrical connection having a positive terminal, a negative terminal, and a plurality of data pins. The NFC reader is positioned within the housing. The battery management system is in communication with the NFC reader and is configured to receive information from the NFC reader including an NFC tag identification. The battery management system is further configured to retrieve stored parameters corresponding to the NFC tag identification, and configure at least one of the plurality of data pins based upon the stored parameters corresponding to the NFC tag identification. The communication is in communication with the battery management system, and is configured to transmit and receive information via Bluetooth. The battery management system is configured to monitor operational parameters of the rechargeable battery cells, as well as data received through the plurality of data pins, including data related to operational performance of a piece of equipment that the battery pack is coupled with. The battery management system is further configured to transmit operational parameters of the rechargeable battery cells and data received through the plurality of data pins over Bluetooth using the communication gateway.

A battery pack is disclosed, according to another exemplary embodiment. The battery pack includes a housing, a plurality of rechargeable battery cells positioned within the housing, a connection interface, a near-field communication (NFC) reader, a battery management system, and a communication gateway. The connection interface is in communication with the plurality of rechargeable battery cells. The connection interface includes an electrical connection having a positive terminal, a negative terminal, and a plurality of data pins. The NFC reader is positioned within the housing. The battery management system is in communication with the NFC reader and is configured to receive information from the NFC reader, including an NFC tag identification. The battery management system is further configured to retrieve stored parameters corresponding to the NFC tag identification, and can then configure at least one of the plurality of data pins based upon the stored parameters corresponding to the NFC tag identification. The communication gateway is in communication with the battery management system and is configured to transmit and receive information via a communication protocol having a frequency exceeding 14 MHz. The battery management system is configured to monitor operational parameters of the rechargeable battery cells and data received through the plurality of data pins and transmit the operational parameters of the rechargeable battery cells and the data received through the plurality of data pins over the communication protocol. At least one of the plurality of data pins can be configured to communication between a Controller Area Network (CAN) bus and the battery management system.

BRIEF DESCRIPTION OF THE DRAWINGS

The disclosure will become more fully understood from the following detailed description, taken in conjunction with the accompanying figures, in which.

DETAILED DESCRIPTION

Figure 1A:
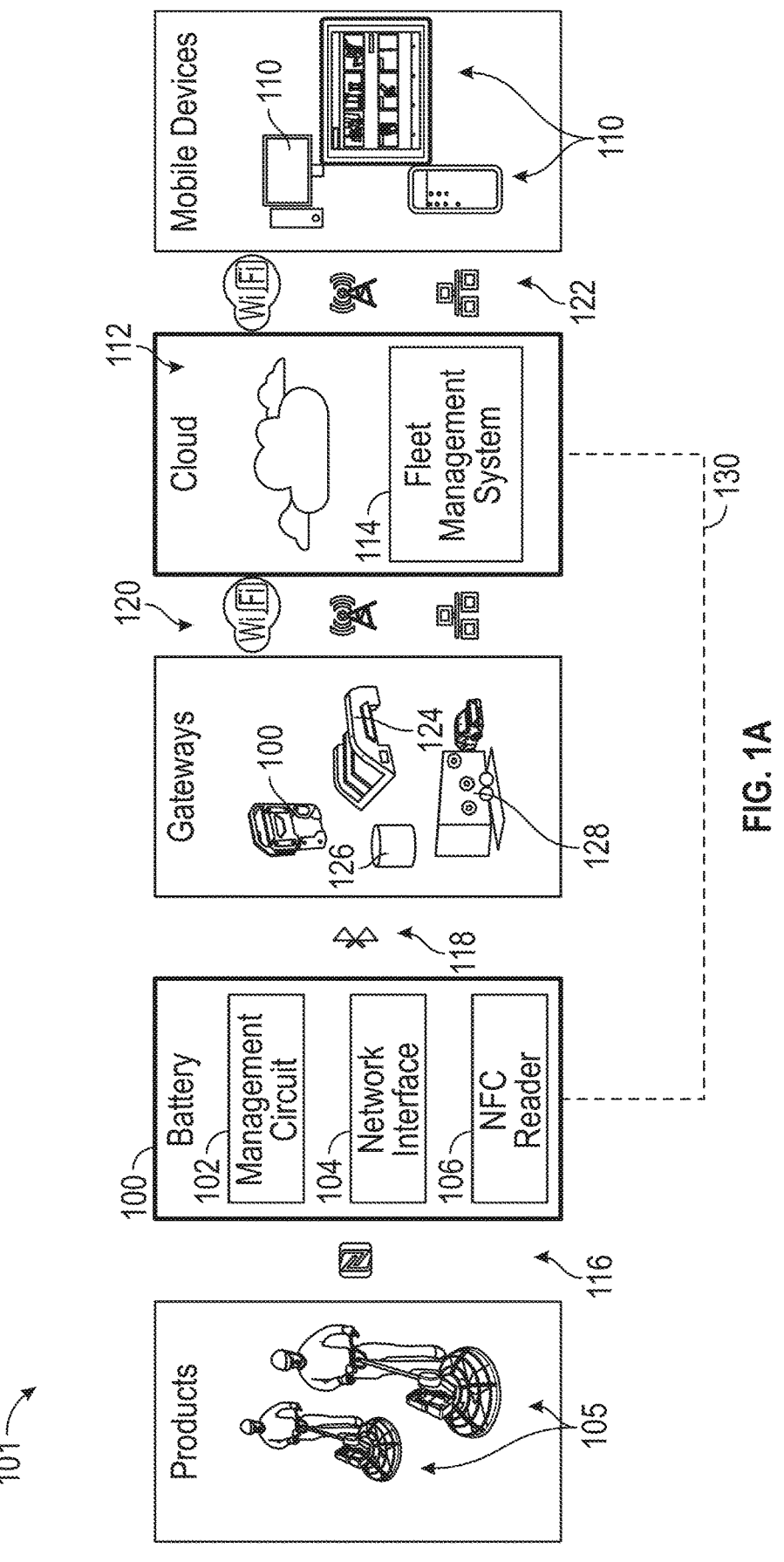
FIG. 1A is a schematic view of a battery management system and the communication between components of the battery management system.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, a battery management system for a battery pack is disclosed. The battery management system can monitor and track information of removable and replaceable battery packs, which can be used to power various types of indoor and outdoor power equipment, as well as portable jobsite equipment and light electric utility and passenger vehicles. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, portable generators, etc. Indoor power equipment includes floor sanders, floor buffers and polishers, vacuums, etc. Portable jobsite equipment includes portable light towers, mobile industrial heaters, and portable light stands.

The battery management system can be incorporated into a generic (e.g., generalized, multi-functional use) battery pack having one or more data pins that are configured to communicate with indoor and outdoor power equipment, jobsite equipment, etc. The battery management system is in communication with the one or more data pins and can configure the data pins based upon a detected type of equipment that is requesting power. Prior to receiving a request from power from a piece of power equipment, the battery pack may have no predefined functions or features mapped to each of the data pins of the battery pack. However, after reading an NFC tag from a project interface (e.g., an interface of a piece of power equipment) and identifying a type of equipment requesting power (from the NFC tag reader, for example), the battery management system can allow a generic battery pack to be specially configured to function fully and uniquely with a connected product (e.g., a portable light tower, a blower, etc.). The battery management system can access local or remote memory to retrieve operation parameters or output characteristics that are optimized for a specific type of identified power equipment associated with the NFC tag. With this information, the battery management system can then configure (or reconfigure) data pins on the battery pack according to these preferred parameters. Beneficially, this pairing between the generic battery pack and the product can be accomplished without requiring a firmware update to the battery pack. Typically, an original equipment manufacturer (OEM) would need to choose whether to use an "unintelligent," universal battery pack or a completely customized solution. The trade-offs of each of these systems can drastically limit the opportunities available to OEMs. By using the battery management system described herein, OEMs advantageously can still have an intelligent, customizable battery pack without a firmware update to configure unique functions for the battery pack with the connected product.

Referring to FIG. 1A, a battery pack 100 in a battery management system 101 is shown, according to an exemplary embodiment. The battery pack 100 can be used to power various products (e.g., a piece of power equipment 105). In some embodiments, the battery pack 100 is used in a design testing environment (e.g., using a development suite). The battery pack 100 is communicably connected to mobile devices 110 (e.g., a tablet) to provide battery and tool information via a communication network 112. A mobile device 110 may be a laptop, a desktop computer, a smartphone, a tablet, etc., for example. As a user is operating the power equipment 105, information is communicated to the mobile device 110 for presentation to a user (e.g., an OEM) of the battery management system 101. The performance of the battery pack 100 and equipment 105 can thus easily be communicated to the user such that the user can design, test, track, and improve products based on a continuously monitored system including both the battery pack 100 and the equipment 105. As such, OEMs can learn how the system operates in quicker fashion such that updates or changes may be made in a more efficient manner. Accordingly, using the battery management system 101, it may be easier to design electrified products for a long-term project since real-time feedback of batteries and equipment performance can be received. Each battery pack 100 in the battery management system 101 includes a unique identification number (e.g., a serial number) for use in tracking by the battery management system 101 (e.g., to track a fleet of equipment 105 coupled to battery packs 100).

In some embodiments, the battery pack 100 communicates with equipment 105 through a communication protocol 116 (e.g., NFC communication) via an NFC reader (106 shown in FIG. 1C) of the battery pack 100 and an NFC tag (134 shown in FIG. 1C) installed in an equipment interface (e.g., equipment interface 132 (FIG. 1B)) of the equipment 105. The battery pack 100 then relays information relating to the equipment 105 to various gateways, such as a dedicated gateway 126, a charger gateway 124, and/or a mobile gateway 128. The battery pack 100 may communicate to gateways via a communication protocol 118. The communication protocol can operate at a frequency higher than NFC (e.g., higher than 13.56 MHz). In some embodiments, the communication protocol 118 is a Bluetooth protocol. The gateways may communicate data to the communication network 112 and fleet management system 114 through communication protocol 120, which may include Ethernet, Wi-Fi, or cellular protocols. In other embodiments, the battery pack 100 may directly communicate (e.g., shown with the dashed line 130) to the communication network 112 (e.g., a cloud, fleet management system 114) for the battery management system 101 using a gateway installed in the battery pack 100. For example, a network interface 104 of the battery pack 100 may include a gateway for sending and receiving cellular transmissions. The communication network 112 may then transmit the information to mobile devices 110 through the communication protocol 122, which may also include Ethernet, Wi-Fi, or cellular protocols. In some embodiments, the mobile devices 110 are used by managers of the fleet management system 114 to monitor and track use of equipment 105.

The battery pack 100 includes a management circuit 102, including diagnostic circuitry and a communications interface. The management circuit 102 is embedded within the battery pack of the battery pack 100. In some embodiments, the management circuit 102 is configured to monitor battery status including current, voltage, temperature, etc., as well as provide charge and discharge protection for the battery pack 100, such as preventing rapid charging of the battery when it may impact the health of the battery pack 100. For example, the management circuit 102 prevents rapid charging when the health of the battery pack 100 or charge of the battery pack 100 is below a certain threshold. The management circuit 102 is further configured to extend the life of the battery pack 100 and provide reliability by monitoring and controlling various battery conditions. The management circuit 102 may include one or more circuits configured to monitor the state of the battery pack 100 or other aspects of the equipment 105 with which the battery pack 100 is used. The management circuit 102 may be further configured to monitor the state of the battery to predict the number of starts capable with the battery.

The management circuit 102, which can be considered a part of a broader battery management system (BMS) in the battery pack 100 may be further configured to monitor other characteristics of the coupled power equipment 105 by communicating with sensors and monitoring devices (e.g., fluid level sensors, temperature sensors, pressure sensors, chronometers, blade speed sensors, etc.). The management circuit 102 may output data related to the information received from the sensors and monitoring devices to a display, such as a user interface integrated into the battery pack 100 or a display shown on a user interface of mobile device 110 or dashboard (e.g., dashboard 115 (FIG. 17)). The display may therefore communicate to an OEM various operational data related to the equipment and the battery pack 100. For example, the management circuit 102 may output to the display information such as operational time, battery charge, or battery temperature, in addition to the operational information received from the coupled power equipment 105. Additionally, the management circuit 102 may monitor the temperature of the battery pack 100 via an input from a temperature sensor. Temperature monitoring can be used to alert the operator (e.g., via the user interface of the mobile device 110) if the battery temperature is too low for normal use of the battery.

In some embodiments, the battery pack 100 includes a network interface 104. In some arrangements, the network interface 104 includes the hardware and logic necessary to communicate over multiple channels of data communication. For example, the network interface 104 may include a Wi-Fi interface, a cellular modem, a Bluetooth transceiver, a Bluetooth beacon, an RFID transceiver, a NFC transceiver, an Ethernet transceiver, or a combination thereof. The network interface 104 facilitates data communication to and from the battery pack 100 (and therefore the equipment 105 on which the battery pack 100 is used). The battery pack 100 can communicate wirelessly with multiple other devices, including another battery pack 100, in a mesh network or interne of things (IoT) system. In this way, the battery pack 100 can communicate and receive status and usage information, as well as configuration data. For example, the battery pack 100 may receive software updates over a network via the network interface 104. In some embodiments, the external device which battery pack 100 communicates with is a charging station, via a wireless gateway of the charging station. The battery pack 100 may communicate with the charging station information regarding a status of battery pack 100 (e.g., currently charging, fully charged, ready to use, reserved, etc.), according to some embodiments. In other embodiments, the battery pack 100 may communicate with a wireless gateway 124 in a portable charger. In other embodiments, the network interface 104 is a communication interface that allows the battery pack 100 to serially communicate with the external device via SPI (serial peripheral interface), I2C (inter-integrated circuit), USB (universal serial bus), etc., or any other serial communications protocol. In some embodiments, the network interface 104 is a communication interface that includes an IoT gateway.

Referring to FIGS. 1A-1G, the battery pack 100 also includes an NFC reader 106 (e.g., embedded inside the core or housing of the battery pack 100) configured to communicate with an NFC tag 134 (e.g., an electrical connector with an NFC sticker) on an interface 132 of the equipment 105. In some embodiments, the NFC reader 106 is integrated with the network interface 104. The communication between the NFC tag 134 on the equipment interface 132 and the NFC reader 106 can allow the battery pack 100 to determine the type of equipment/tool to which the battery pack 100 is providing power for operation. As such, the battery pack 100 is configured to identify a tool or piece of equipment wirelessly through the NFC tag 134 on the equipment interface 132. Once the battery pack 100 is inserted into an equipment interface 132 to couple to the equipment 105 (e.g., using the male and female connection interfaces 219, 183), the battery pack 100 (e.g., via NFC reader 106) reads the information from the NFC tag 134 of the equipment interface 132 (which may include an equipment serial number, type, battery slot location, and/or logic for how the power equipment turns the battery pack 100 on and off, for example) and associates the battery pack 100 usage data with that specific tool or piece of power equipment 105. The battery pack 100 can also reconfigure data pins specifically to the tool. The NFC tag 134 could also be used to identify what slot the battery pack 100 is plugged into if a tool has multiple battery slots (e.g., a piece of equipment that draws more power during operation may be coupled to more than one battery pack 100). The battery pack 100 can also be configured to read out fault codes with a mobile device 110. The mobile device 110 can communicate via NFC to receive the fault codes. In this way, even if communication network 112 is down, the battery pack 100 can still communicate with a mobile device 110. In addition, a Controller Area Network (CAN) type of communication is not necessary in order to communicate with the battery pack 100. In some embodiments, the battery pack 100 uses radio-frequency identification (RFID) to identify a tool or piece of equipment. In still further examples, the data pins are configured so that inputs on the power equipment (e.g., light switches, power commands, ignition switches, etc.) can communicate through the data pins to request and/or activate the battery pack 100 to supply power. In some examples, the battery pack 100 can serve as a controller that provides different functionality to the power equipment 105. For example, the battery management system onboard the battery pack 100 can provide pulse width modulation (PWM) dimming to a portable light tower, for example. Accordingly, the equipment 105 can be manufactured with even less complex electronics, which can further reduce the cost of producing power equipment.

In some embodiments, the battery pack 100 does not include cellular communication capabilities (e.g., a base pack) and as such, requires a separate gateway (e.g., a dedicated gateway 126, another battery pack 100 having cellular communication capabilities, a mobile gateway 128) to communicate via the communication network 112. In some embodiments, the battery pack 100 includes cellular communication capabilities and acts as a gateway (e.g., an IoT gateway). As such, data communication between the battery pack 100 and mobile devices 110 (e.g., endpoint devices) in various combinations may be facilitated by the communication network 112. In some arrangements, the communication network 112 includes cellular transceivers. In another arrangement, the communication network 112 includes the Internet. In yet another arrangement, the communication network 112 includes a local area network (LAN) or a wide area network (WAN). The communication network 112 may be facilitated by short and/or long range communication technologies including Bluetooth transceivers, Bluetooth beacons, RFID transceivers, NFC transceivers, Wi-Fi transceivers, cellular transceivers, wired network connections, etc. As such, in one embodiment, the communication between the mobile devices 110 and the battery pack 100 can be facilitated by and connected to a cloud-based system via RFID and Wi-Fi connections on the battery pack 100. In another embodiment, the communications can be facilitated by and connected to a cloud-based system via Wi-Fi only. In another embodiment, the communications can be facilitated by and connected to a cloud-based system via cellular transceivers. In yet another embodiment, the communications can be facilitated by and connected to a cloud-based system via Bluetooth and cellular transceivers. In all such embodiments, the cloud-based system can be made accessible to a third party, such as a consumer and/or rental company.

Figure 1B:
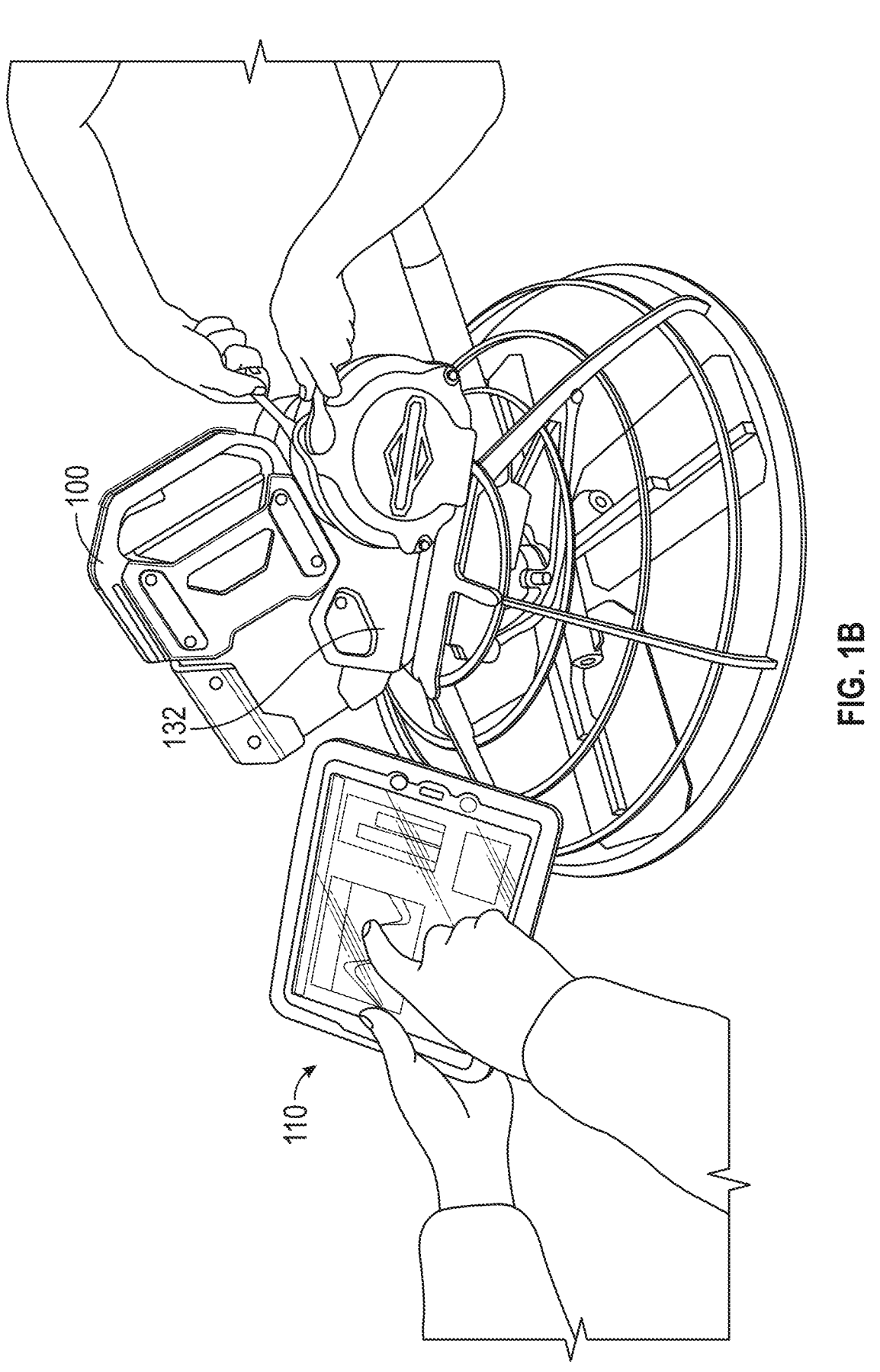
FIG. 1B is a perspective view of a battery system in use with a piece of power equipment and a management system user interface on a mobile device.

Referring to FIG. 1B, a perspective view of a battery pack 100 in use with a piece of power equipment 105 and the battery management system 101 is shown, according to an exemplary embodiment. The battery pack 100 is removable and rechargeable. The battery pack 100 is configured to be coupled with an equipment interface 132 removably mounted on a piece of equipment or inserted (e.g., dropped, lowered, placed) into a receiver integrated with a piece of equipment 105 and/or a charging station. The battery pack 100 can be installed into a piece of equipment vertically, horizontally, and/or at any angle. The battery pack 100 is a Lithium-ion battery. However, other battery types are contemplated, such as nickel-cadmium (NiCD), lead-acid, nickel-metal hydride (NiMH), lithium polymer, etc. The battery pack 100 yields a voltage of approximately 48 Volts (V) and 1400 Watt-hours (Wh) of capacity. In other embodiments, the battery pack 100 may be configured to yield a higher or lower voltage. It is contemplated that battery packs of other sizes may also be used. In some embodiments, the battery pack 100 is capable of approximately 2,000 charge/discharge cycles, approximately 5,000 W continuous power (13 Amps (A) per cell), 9,000 W peak power (25A per cell), and 14,000 W instantaneous power (40A per cell). In other embodiments, the battery pack 100 may be capable of more or less continuous, instantaneous, and peak power. The battery pack 100 in total weighs less than approximately twenty-five pounds, allowing for ease of portability, removal, and replacement. The battery pack 100 may also be hot-swappable, meaning that a drained battery pack 100 can be exchanged for a new battery pack 100 without completely powering down connected equipment. As such, downtime between battery pack 100 exchanges is eliminated. Additional structural aspects of the battery pack 100 are shown and described in commonly-owned PCT/US202/043981, filed Jul. 29, 2020, entitled "Battery System and Related Management System," the content of which is hereby incorporated by reference in its entirety.

The battery pack 100 can be removed by an operator from a piece of equipment 105 without the use of tools and recharged using a charging station. In this way, the operator may use a second rechargeable battery having a sufficient charge to power equipment while allowing the first battery to recharge. In addition, the battery pack 100 can be used on various types of equipment 105 including indoor, outdoor, and portable jobsite equipment. Due to its uniformity across equipment, the battery pack 100 can also be used as part of a rental system, where rental companies who traditionally rent out pieces of equipment can also rent the battery pack 100 to be used on such equipment. An operator can rent a battery pack 100 to use on various types of equipment or vehicles the operator may own and/or rent and then return the battery pack 100 to be used by other operators on an as-needed basis. Furthermore, multiple battery packs 100 may be used in conjunction with each other to provide sufficient power to equipment that may require more than a single battery pack.

The battery pack 100 is configured to be selectively and electrically coupled to a piece of equipment 105 and/or a charging station (e.g., charging station 124 shown in FIG. 1A). The piece of equipment 105 or charging station includes a receiver having electrical terminals that are selectively and electrically coupled to the battery pack 100 without the use of tools. For example, an operator may both insert (and electrically couple) and remove (and electrically decouple) the battery pack 100 from a piece of equipment 105 (e.g., from terminals of a receiver) without the need for tools. The equipment interface 132 and/or receiver may include a planar mounting surface having at least one aperture for receiving a threaded fastener and the equipment interface 132 and/or receiver may be coupled to the piece of equipment via a threaded fastener.

The battery pack 100 can also include a user interface configured to display various status and fault indications of the battery pack 100. The user interface may use light-emitting diodes (LEDs), liquid crystal display, etc., to display various colors or other indications. An LED display of the battery pack 100 can provide battery charge status, and can blink or flash battery fault codes. An LCD display can provide additional information about the battery pack 100 including condition, tool specific data, usage data, faults, customization settings, etc. For example, battery indications may include, but are not limited to, charge status, faults, battery health, battery life, capacity, rental time, battery mode, unique battery identifier, link systems, etc. The user interface can be a customized version of a user interface tailored to a specific tool, use, or operator.

Figure 1C:
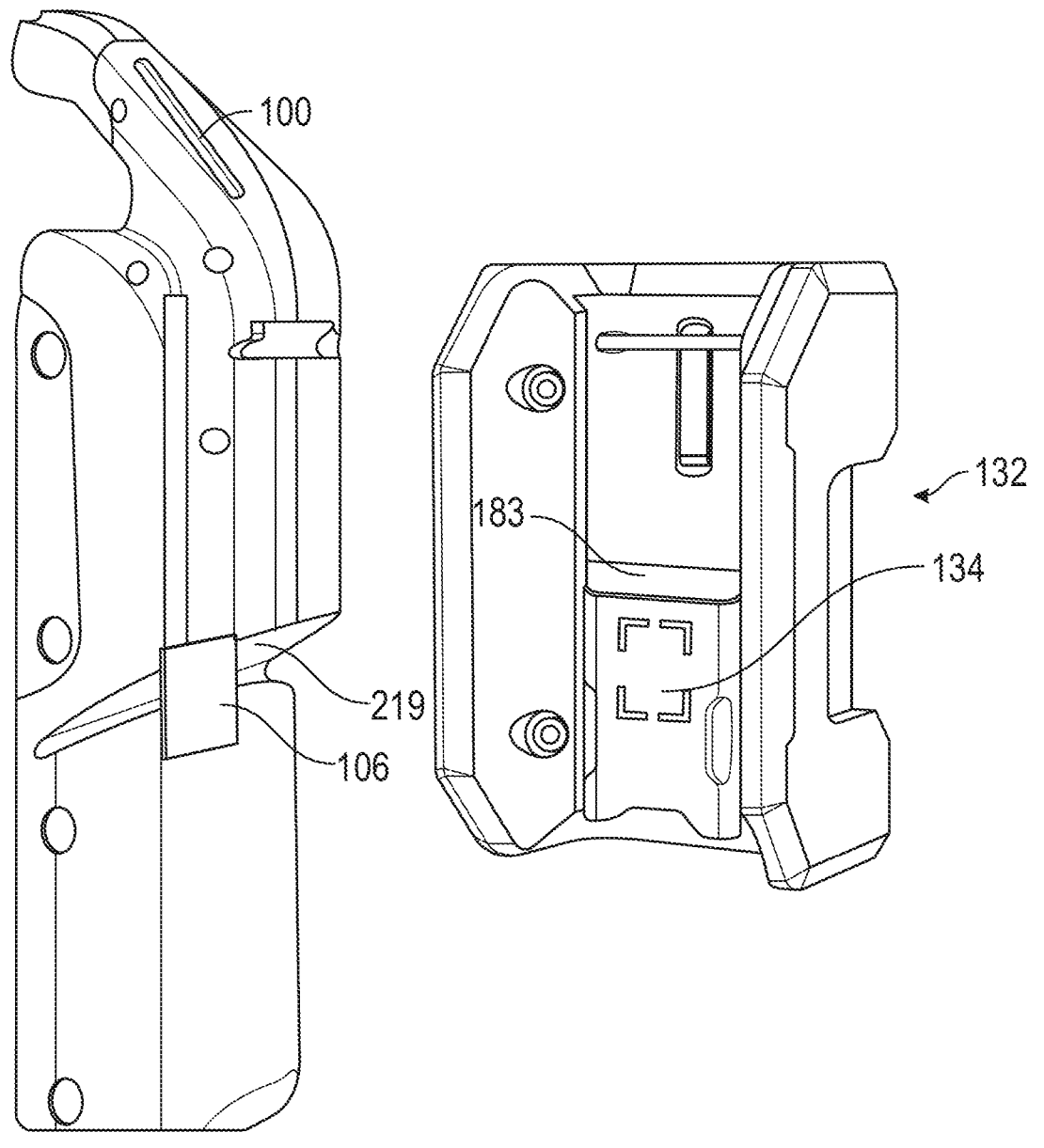
FIG. 1C is a perspective view of the battery pack and the equipment interface of FIG. 1B with a near-field communication (NFC) reader and tag.
Figure 1D:
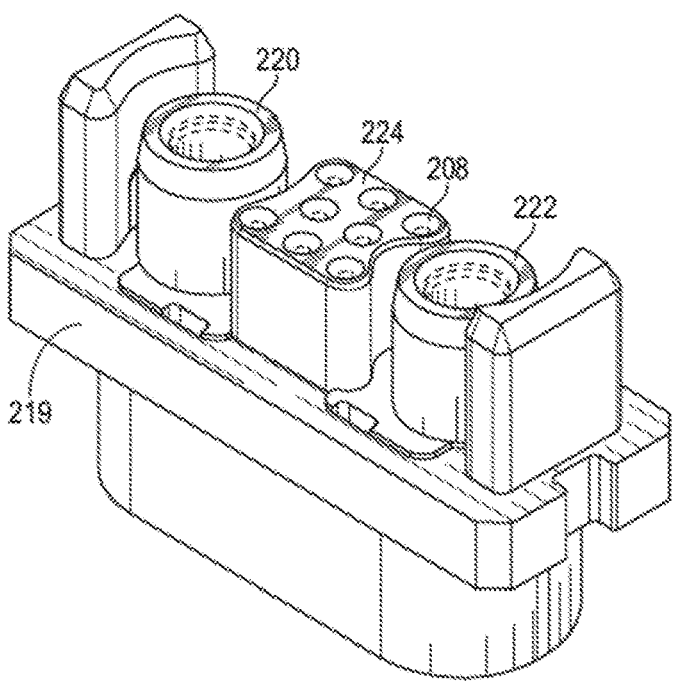
FIG. 1D is a perspective view of a male connection interface that can be incorporated into the battery pack of FIG. 1C.
Figure 1E:
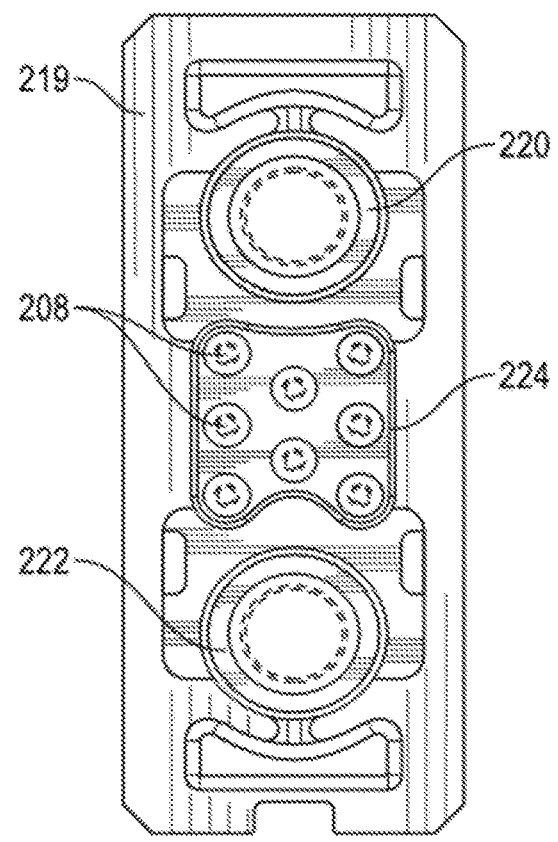
FIG. 1E is a top view of the male connection interface of FIG. 1D.

Referring now to FIGS. 1C-1G, a perspective view of the battery pack 100 and the equipment interface 132 is shown, according to an exemplary embodiment. The equipment interface 132 includes two vertical walls and a receptacle between. The battery pack 100 is configured to slide into the receptacle and lock into place on the equipment interface 132. The equipment interface 132 includes male connectors (e.g., male connectors 219, shown in FIGS. 1D and 1E) configured to mate with the ports of the battery pack 100 (e.g., the female connectors 183, shown in FIGS. 1F and 1G) in an installed position of the battery pack 100 on the equipment interface 132. The battery pack 100 is slid downward into the equipment interface 132 until the male connectors connect with the ports into the mating portion of the battery pack 100 and the horizontal member on the equipment interface 132 is coupled with the slot on the battery pack 100. As shown in FIG. 1B, the equipment interface 132 is mounted to a piece of equipment 105 and the battery pack 100 is removably inserted into the equipment interface 132 to interface with and provide power to the piece of equipment 105. The battery pack 100 includes NFC reader 106 embedded within the housing of the battery pack 100. In some embodiments, the NFC reader 106 is proximate a mating portion of the battery pack 100, where the battery pack 100 couples to the male connectors of the equipment interface 132. FIG. 1C shows the equipment interface 132 with the embedded NFC tag 134 near a mating portion of the equipment interface 132. In some embodiments, the NFC tag 134 is a sticker that is placed in or on the male connector portion of the equipment interface 132, proximate where the battery pack 100 directly couples to the equipment interface 132. In other embodiments, the battery pack 100 includes an NFC tag as well.

Referring now to FIGS. 1D-1G, male and female connectors 219, 183 forming a connection interface within the equipment interface 132 are shown, according to an exemplary embodiment. The male connector 219 can be positioned on the battery pack 100 to electrically couple the battery pack 100 to external devices (e.g., power equipment, etc.). The male connector 219 generally includes a positive terminal 220, a negative terminal 222, and a data terminal 224. The positive terminal 220 and negative terminal 222 each have a separate and dedicated electrical connection extending away from the connector 219 to the battery cells within the battery pack 100. The positive terminal 220 and the negative terminal 222 are configured to selectively supply electricity from the battery cells to the external device that the battery pack 100 is coupled with. In some examples, the positive terminal 220 and negative terminal 222 are configured to limit output current from the battery pack 100 to about 20 Amps, while the input current through the data terminal 224 is limited to about 2A.

The data terminal 224 is positioned between the positive terminal 220 and negative terminal 222 and is configured to create a wired connection with corresponding data terminals on the external device. The data terminal 224 houses a series of data pins 208 that are configured to both receive and transmit data between the battery pack 100 and the external device coupled to the battery pack 100. The data pins 208 are configurable based upon the type of external device that is coupled to the battery pack 100. For example, the purpose or function of some or all of the data pins 208 may be different when the battery pack 100 is coupled to a zero-turn radius lawnmower rather than a pressure washer. The data pins 208 can be configured to monitor various aspects of the external device, including runtime, health, battery usage, and other characteristics. The data pins 208 can also be configured to generate a user interface (e.g., on a user interface 705, discussed below) that can be used to control or monitor the external device separate from its dedicated control panel. Accordingly, the battery assembly 100 may provide a digital control panel or a digital dashboard for equipment that might not otherwise present any performance-based data. The number of data pins 208 present within the data terminal 224 can be varied based upon the degree of control and functionality needed. In some examples, the data terminal 224 houses eight data pins 208.

Figure 1F:
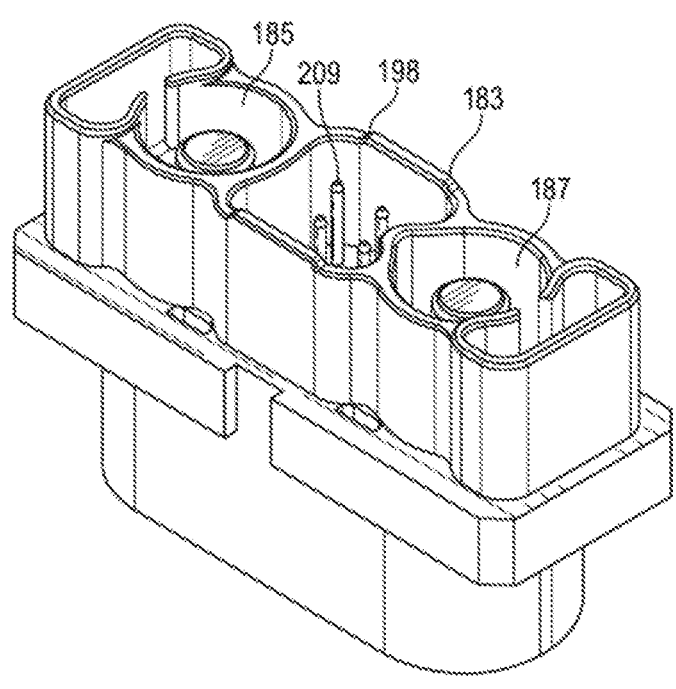
FIG. 1F is a perspective view of a female connection interface that can be incorporated into the battery pack of FIG. 1C or into the power equipment of FIG. 1B.
Figure 1G:
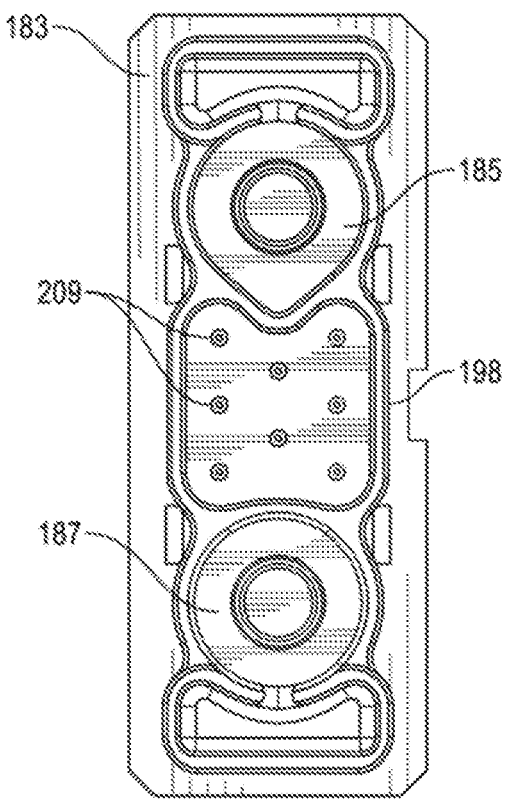
FIG. 1G is a top view of the female connection interface of FIG. 1F.

The male connector 219 on the battery pack 100 is configured to mate with the female connector 183 on the equipment interface 132. The female connector 183 includes three dedicated female terminals or connectors 185, 187, 198 that are configured to mate with the positive terminal 220, negative terminal 222, and data terminal 224 on the first, male connector 219. As depicted in FIGS. 1F and 1G, the terminal 198 can house and support a plurality of data pins 209 to couple with and communicate with data pins 208. To install the battery assembly 100 onto the equipment interface, the terminals 220, 222, 224 are first aligned with the dedicated female terminals 185, 187, 198 on the equipment interface 132. Urging the terminals 220, 222, 224 toward the three dedicated female terminals 185, 187, 198 creates a removable coupling between the terminals 220, 222, 224 and female terminals 185, 187, 198 that also creates electrical communication between the battery assembly 100 and the external device supporting the equipment interface 132. In the installed position, the female connector 198 receives the data terminal 224, which creates a wired data connection between the data pins 208 and the data pins 209. Applying a threshold force in an opposite direction (e.g., pulling the terminals 220, 222, 224 away from the external device will cause the connector 219 to release the equipment interface 132 and decouple the battery assembly 100 from the external device supporting the equipment interface 132.

Figure 2:
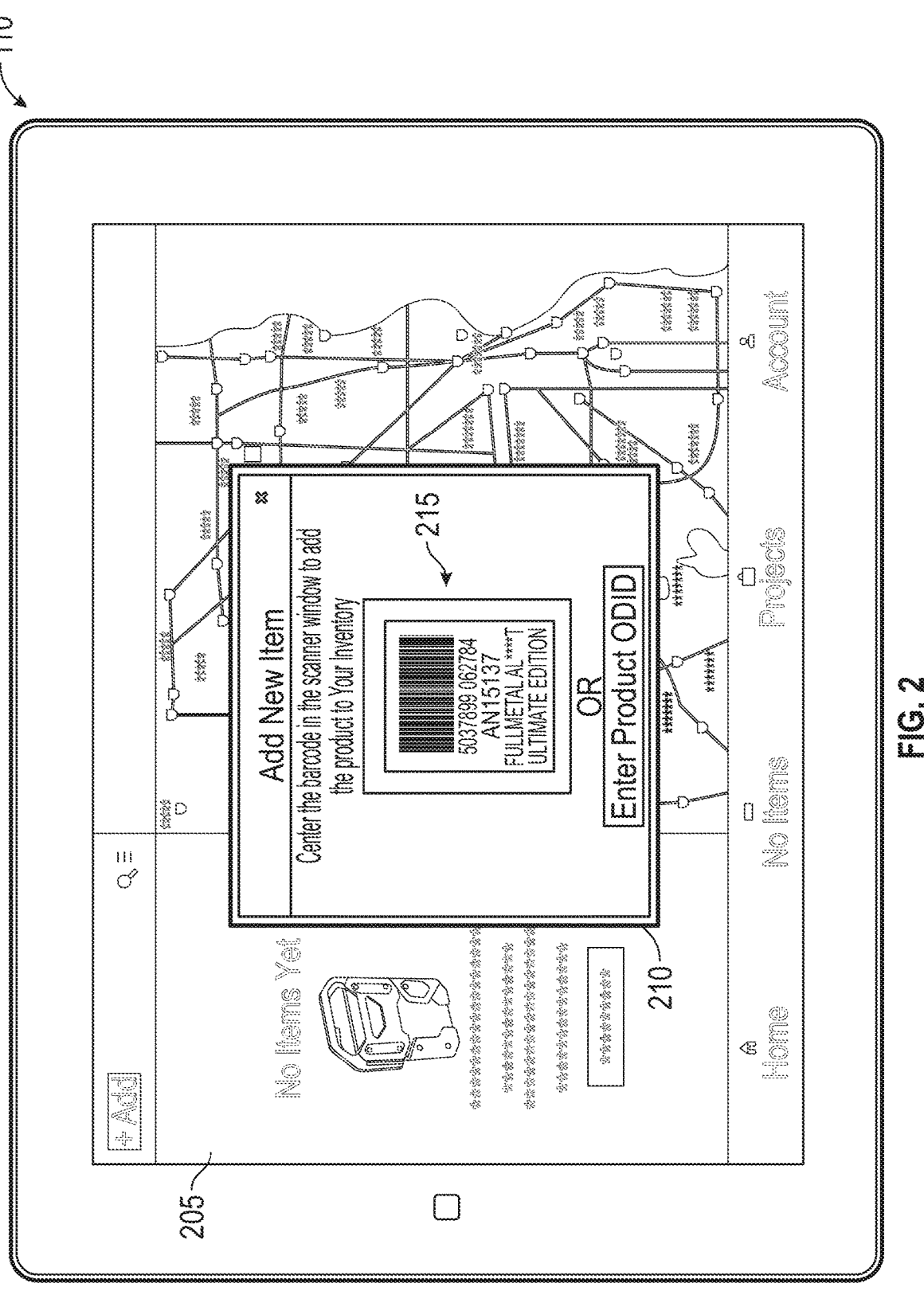
FIG. 2 is a front view of a user interface of adding a battery system to the management system.

Referring now to FIG. 2, user interface 205 on the mobile device 110 is shown, according to some embodiments. The user interface 205 can be displayed after logging into the management system 101 and selecting an activatable "Add" button. Upon selection of the "Add" button, a pop up window is generated and displayed on the display screen of the mobile device 110. The "Add New Item" pop-up window allows a user of the management system to scan a barcode (e.g., via a camera of the mobile device 110) in scanner window 215 to add an item or product (e.g., a battery pack, an air blower, a light tower, other types of power equipment products, etc.) to the management system. The generated pop-up window also includes an activatable button a user may select to enter a product specific identification (ID) number manually.

Figure 3:
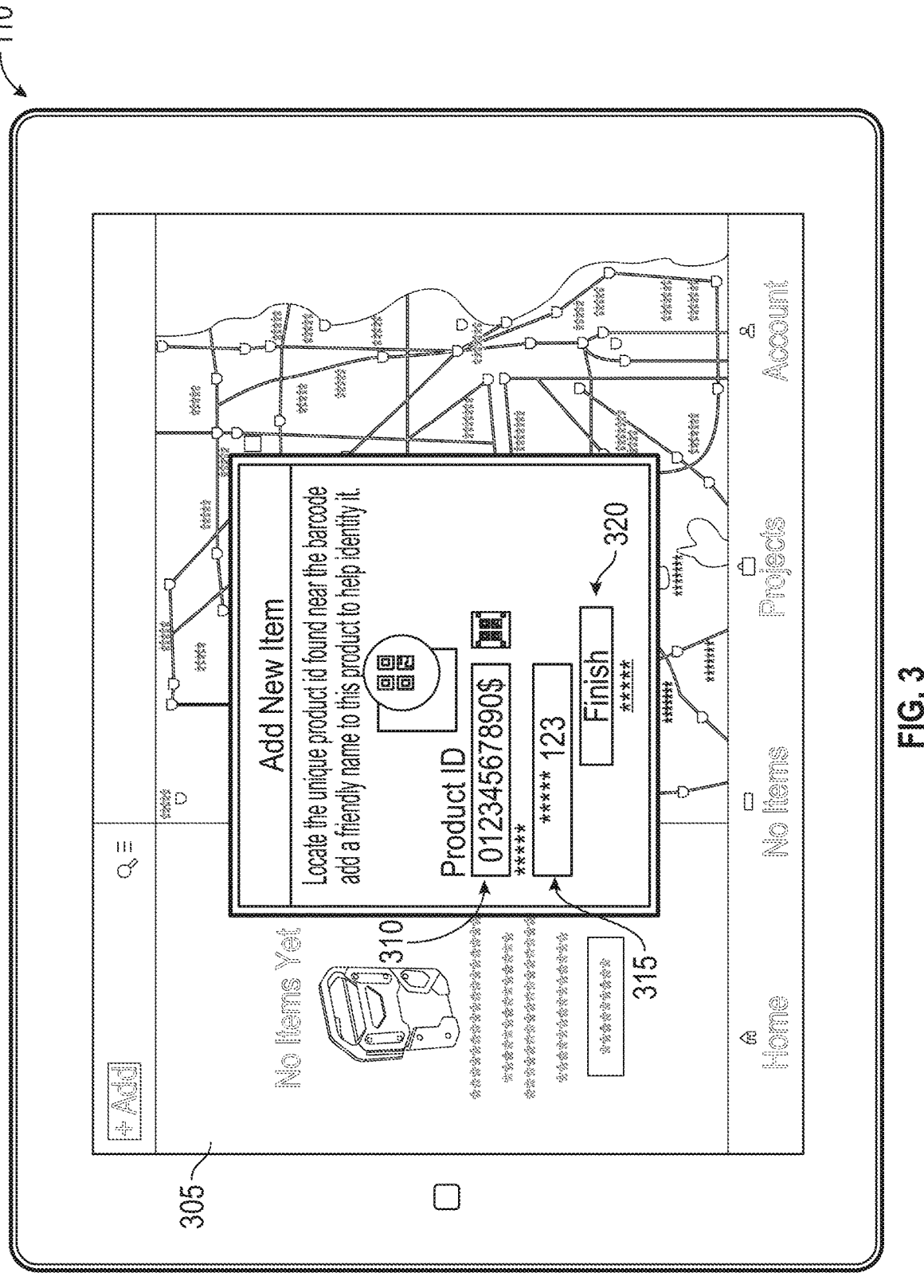
FIG. 3 is a front view of a user interface of another method of adding a battery system to the management system.

FIG. 3 depicts user interface 305 on a display screen of the mobile device 110, according to some embodiments. In some embodiments, user interface 305 is generated and displayed on the mobile device 110 after a link on user interface 205 is selected to enter a product ID number manually. The user interface 305 includes a generated pop-up window for adding a new item via a unique product ID number (e.g., a unique serial number located near a barcode on the product). The "Add New Item" window includes, but is not limited to, an input 310 for the product ID number, an input 315 for a name of the new item, and an activatable button 320 to finish adding the new item. The user interface 305 also includes an activatable link to save the new item (e.g., battery powered equipment product) and directly add another new product. Furthermore, a user may select an icon to return to the user interface 205 to add the new product via scanning a barcode using the mobile device 110.

Figure 4:
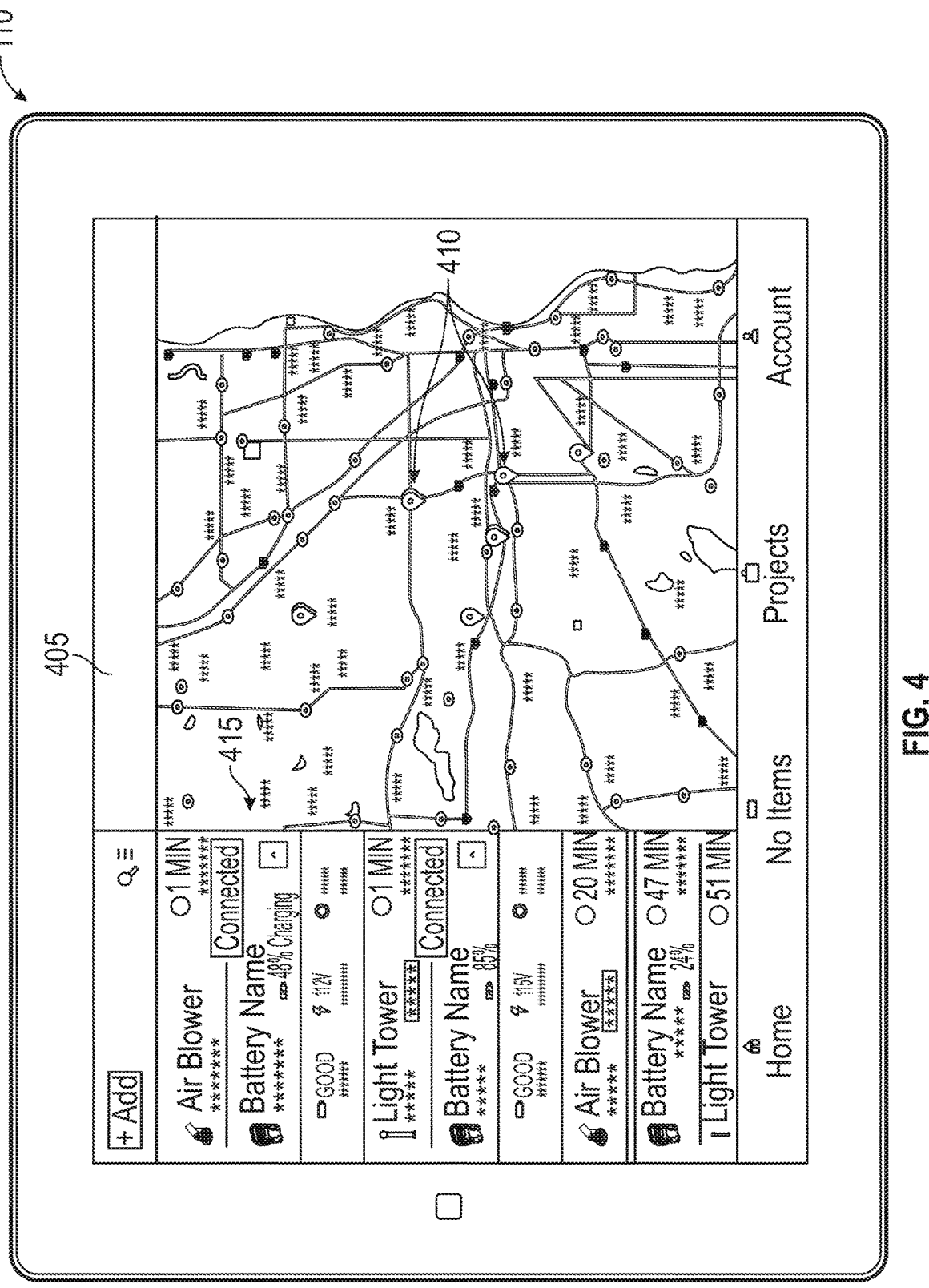
FIG. 4. is a front view of a user interface displaying a list of multiple battery systems being monitored by the management system.

Referring now to FIG. 4, a user interface 405 on the mobile device 110 is shown, according to some embodiments. The user interface 405 may be displayed when a "My Items" tab is selected in a task bar of the management system. The task bar may also include options for a "Home" tab, a "Projects" tab, and an "Account" tab for editing a user profile (e.g., an OEM profile page, a rental service user profile, etc.). The user interface 405 includes a map indicating the locations 410 of the items added by the user to the management system. The current items being tracked and monitored by the management system are shown in the product list 415 on the left-hand side of the user interface 405, according to one embodiment. Each of the locations 410 correspond with an item in the product list 415. In response to selection of one of the locations 410, an item in the products list 415 may be highlighted and/or expanded to show a user more information on the product corresponding with the selected location. For example, upon selection of a location 410, where a light tower and air blower are currently located and being operated, a summary of information on the current operation of the air blower and the light tower may be shown. The summary may include, but is not limited to, the name of the item in the product list 415, the name of a battery connected to the item, the amount of charge remaining in the connected battery, the battery status of the equipment (e.g., good battery health, fault detected in the battery, poor battery health, etc.), the amount of voltage remaining for the item to use (e.g., 11.2 volts (V)), the temperature of the item, the product ID number, the address of the location of the item, and the amount of time the item has been running (i.e., turned on, using battery power).

Figure 5:
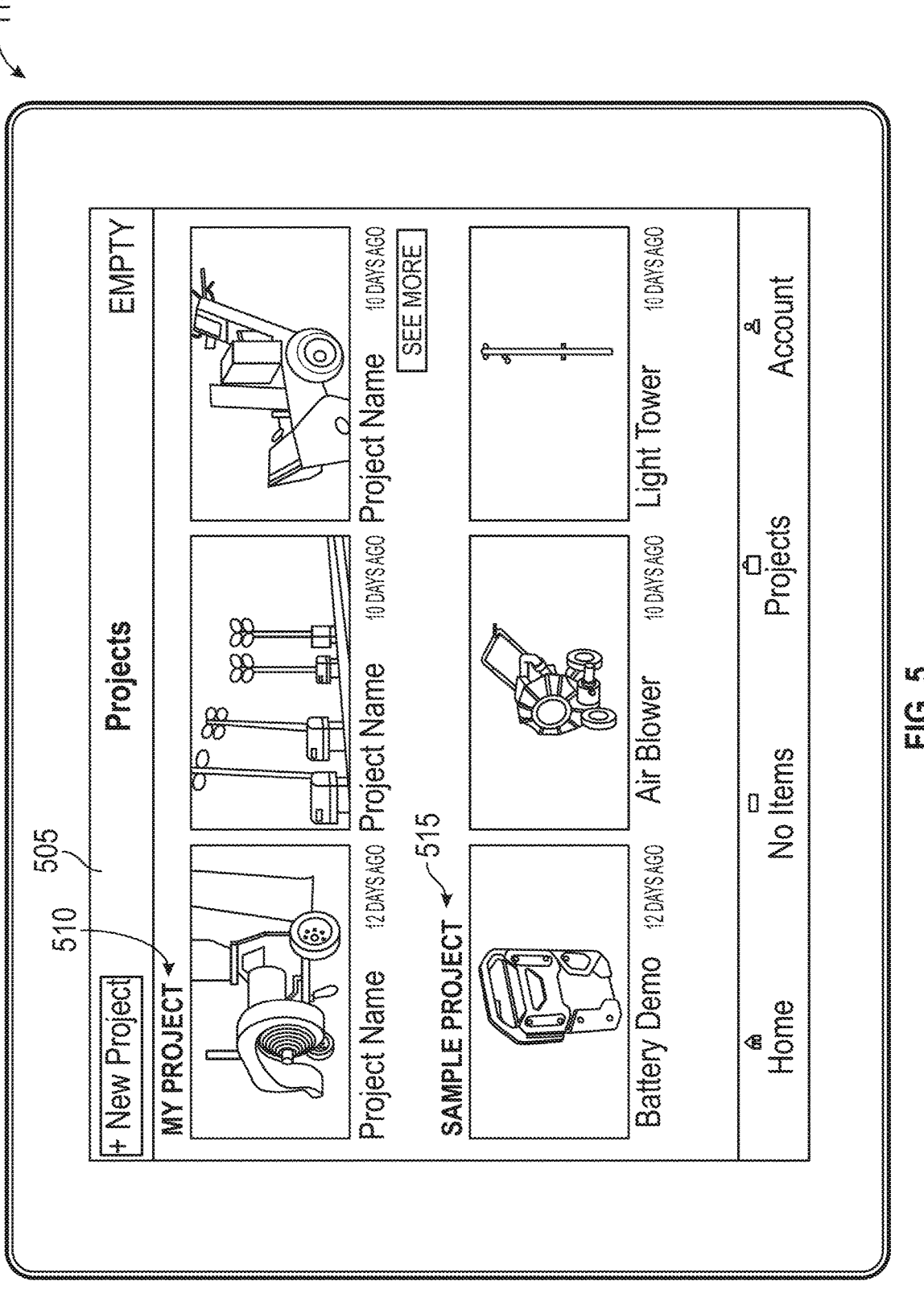
FIG. 5 is a front view of a user interface depicting various projects in the management system.

FIG. 5 depicts a user interface 505 on the mobile device 110 for viewing current projects and adding new projects in the management system 101, according to some embodiments. The user interface 505 includes a "My Projects" list 510 of the ongoing projects being monitored by the management system. For example, a project for the use of a battery-powered piece of equipment (e.g., a lawn mower) may be displayed with an icon for the type of product used in the project. The image of the type of product operated for the project (e.g., a lawn mower) also includes a time for the project. In some embodiments, the time of the project displays the number of days that have passed since the project began. In other embodiments, the time displayed in the icon for the project may include a date the project began, the number of hours the project has been ongoing, the amount of days remaining in a schedule for the project, and so on. The user interface 505 also includes a "Sample Projects" list 515, which may display several types of projects that are being tested (e.g., products used in a demo, products under development, etc.). A user of the management system 101 may delete all the projects loaded and displayed in the "Projects" tab via an "Empty" activatable link. Furthermore, a user (e.g., an OEM manager) may add a new project via a "New Project" activatable button or may select a "See More" activatable button to view a list of current projects of the user (e.g., an OEM). Accordingly, an OEM may be able to efficiently manage and track a large number of projects and a variety of products (e.g., outdoor power equipment made by the OEM) via the management system. For example, if the OEM rents out power equipment to other users, the OEM may be able to track where the rented equipment is currently located by selecting a corresponding project for the rental of that equipment.

Figure 6:
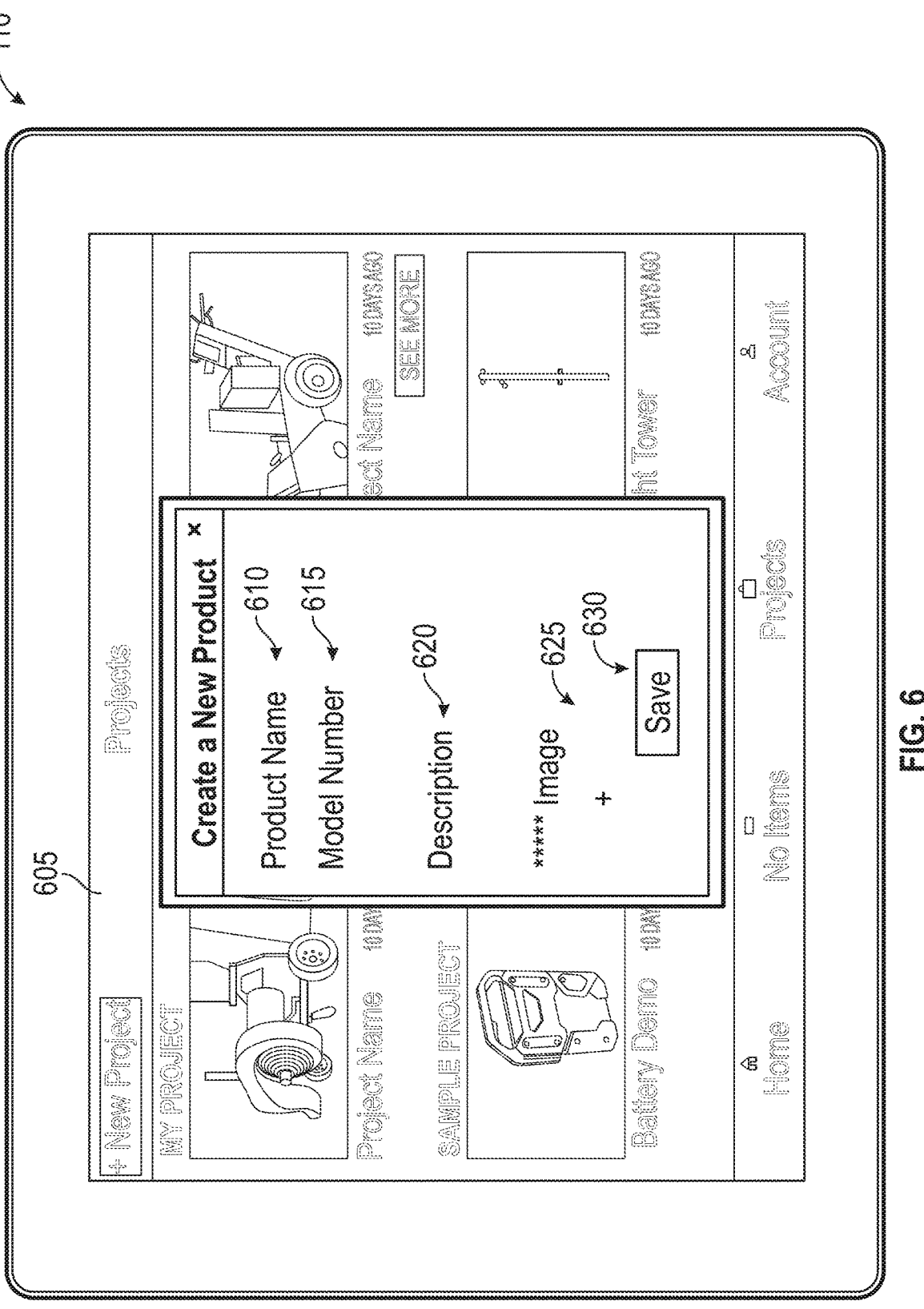
FIG. 6 is a front view of a user interface of creating a new product on the management system.

Referring now to FIG. 6, a user interface 605 on the display of the mobile device 110 shows the input options for adding a new product to the management system, according to one example. The user interface 605 may be generated after a selection on the user interface 505 to create a new project on the management system. The pop-up window of user interface 605 includes input for a name of the product input 610, a model number input 615, a description input 620, and an image input 625, in some embodiments. Upon selection of the image input 625, the mobile device 110 may display a user image for capturing a photo with a camera of the mobile device. Once the product details are filled out for the new product, a "Save" activatable button 630 may be selected to store the new product on the "Projects" tab of the management system. In other embodiments, the pop-up window on the user interface 605 may include inputs for other details of the product, such as a date of manufacturing, a rental date, a name of the OEM that owns and rents out the product, etc.

Figure 7:
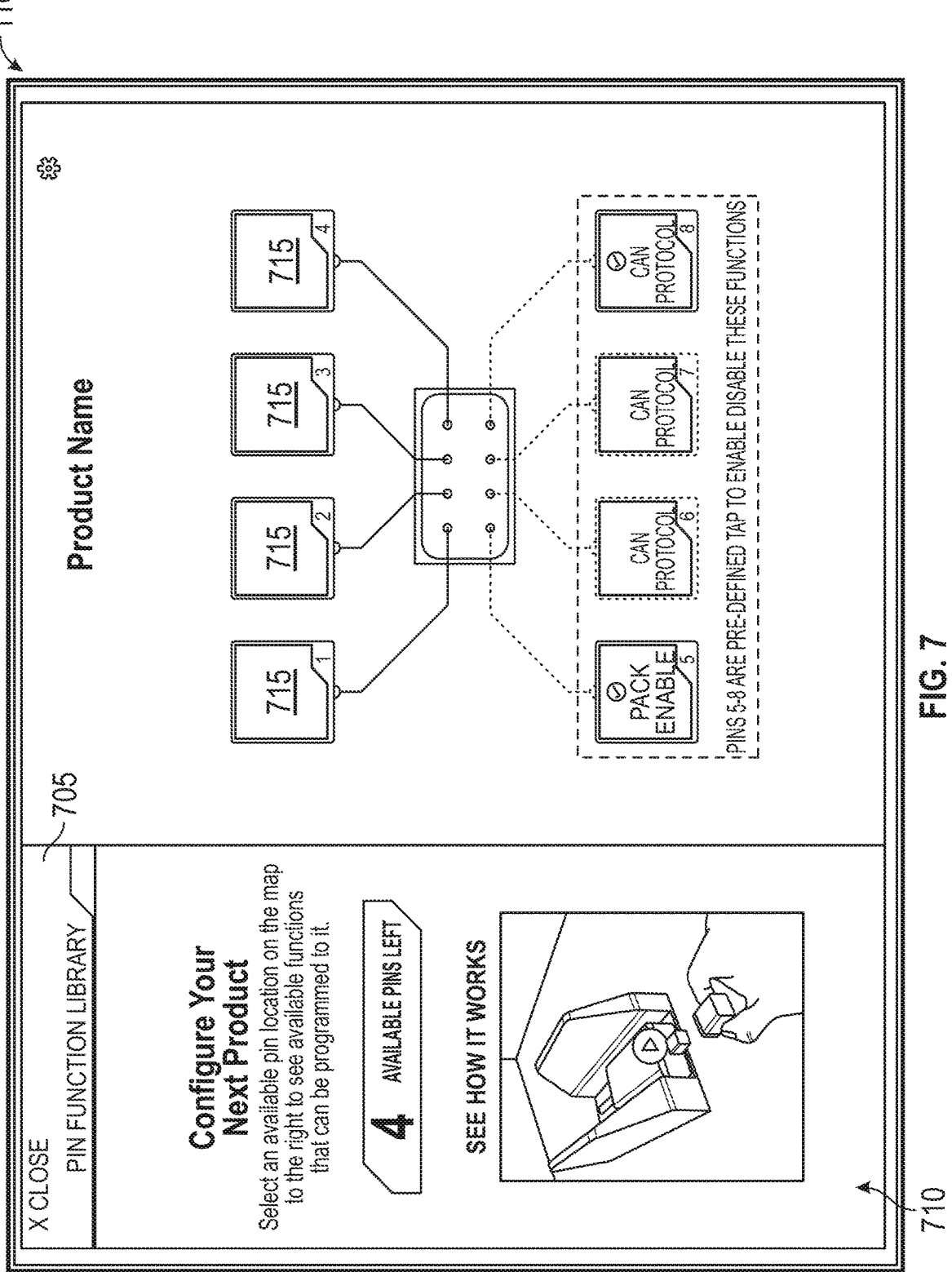
FIG. 7 is a front view of a user interface for configuring data pins for the new product on the management system.
Figure 8:
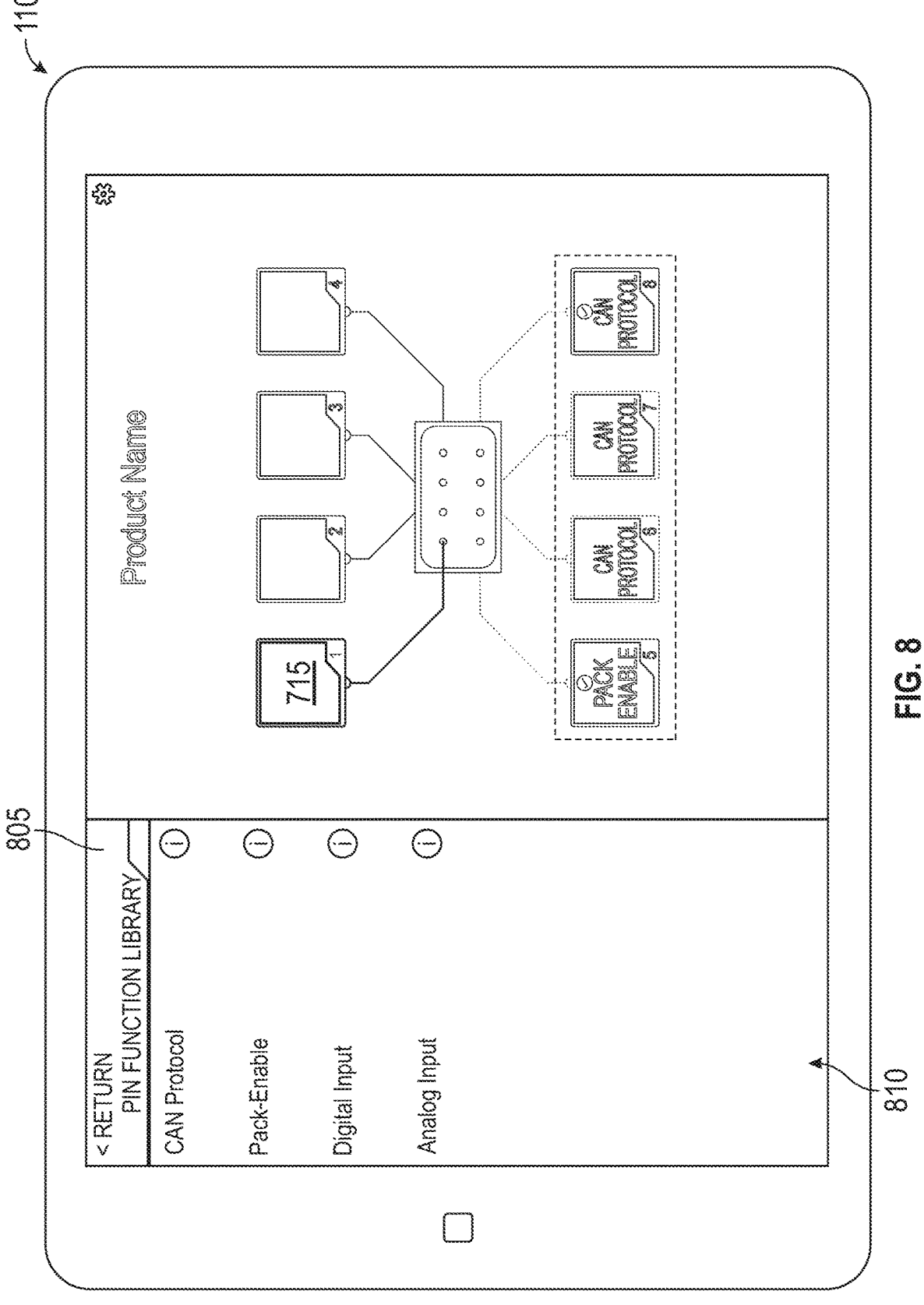
FIG. 8 is a front view of a user interface for selecting a type of pin function for a data pin of a new product on the management system.

FIG. 7 depicts a user interface 705 for configuring data pins of a new product on the management system 101 of FIG. 1. In some embodiments, the user interface 705 is displayed after product details are input for the new product and the activation of "Save" button 630 of user interface 605. The user interface 705 includes a pin function library on the left-hand side and a connection interface for the new product with eight data pins. In other embodiments, the management system configures a function for more or less than eight data pins. The data pins 715 are not yet programmed. Once the function of one of the data pins 715 is programmed using the pin function library, the representation of the data pin icon may change color and display a check mark. The programmed data pins may also display the selected function of the data pin, such as a data pin for an enable for the battery pack 100 or a data pin for CAN protocol communication. In some examples, the battery has a CAN identification that can be updated depending on the type of equipment or location where the battery pack 100 is connected. The user interface 705 can be used to select available pin locations on a map that is representative of the connection interface of the new product. In response to selection of one of the data pins 715 that are not programmed, a list of available functions may be displayed via user interface 805 (FIG. 8). The data pins can function as input/output (I/O) modules, to transmit information both to and from the battery management system 101 of the battery pack 100. In some embodiments, the programmable data pins are included in a small programmable module produced by an OEM. The programmable module may be mounted to an interface 132 of the power equipment. The programmable module can receive a mechanical and electrical connection to battery packs 100. In some embodiments, the programmable module has an electrical connection of at least 1 kW with the coupled battery pack 100.

The programmable data pins can allow a user to configure the equipment 105 to extract data and manage the power equipment 105 based on the needs of the user. For example, one customer may program the data pins to be an analog input and receive an output of that pin via a user interface of the management system 101. The dynamic programming capabilities of the data pins and management system 101 provide users with a multitude of options for the user interface of the management system (e.g., dashboard 115 (FIG. 17)). The management system may be used for testing a new product of an OEM or may be used in the field while operating the power equipment. The user may optimize the use of the battery packs 100 for the user's needs. Furthermore, a user can view diagnostics of products, such as a lawn mower or air blower remotely and can choose which diagnostics to track for the battery packs 100. A user is also able to remotely control the product (e.g., an air blower) via a connected battery pack 100. For example, a function of a data pin can be programmed to instruct the connected battery pack 100 to power down, thus shutting off the equipment coupled to the battery pack 100. In some examples, different data pin configurations can be stored within the NFC tag 134 that is positioned on the power equipment 105.

Referring now to FIG. 8, user interface 805 on the mobile device 110 displays several options for programming one of the data pins 715, according to one embodiment. After selection of one of the data pins 715, the pin function library may show options for various functions of the data pin. In some embodiments, these functions include CAN protocol, pack enable, digital input, and analog input. Each option shown in the pin function library may include an information link for a user (e.g., an OEM) to view an explanation of the type of pin function. For example, the information for the CAN protocol function may be displayed in a pop-up window on user interface 805. The pin function information that a Controller Area Network (CAN bus) is a robust vehicle bus standard designed to allow microcontrollers and devices to communicate with each other's applications without a host computer. The CAN protocol is a message-based protocol.

Figure 9:
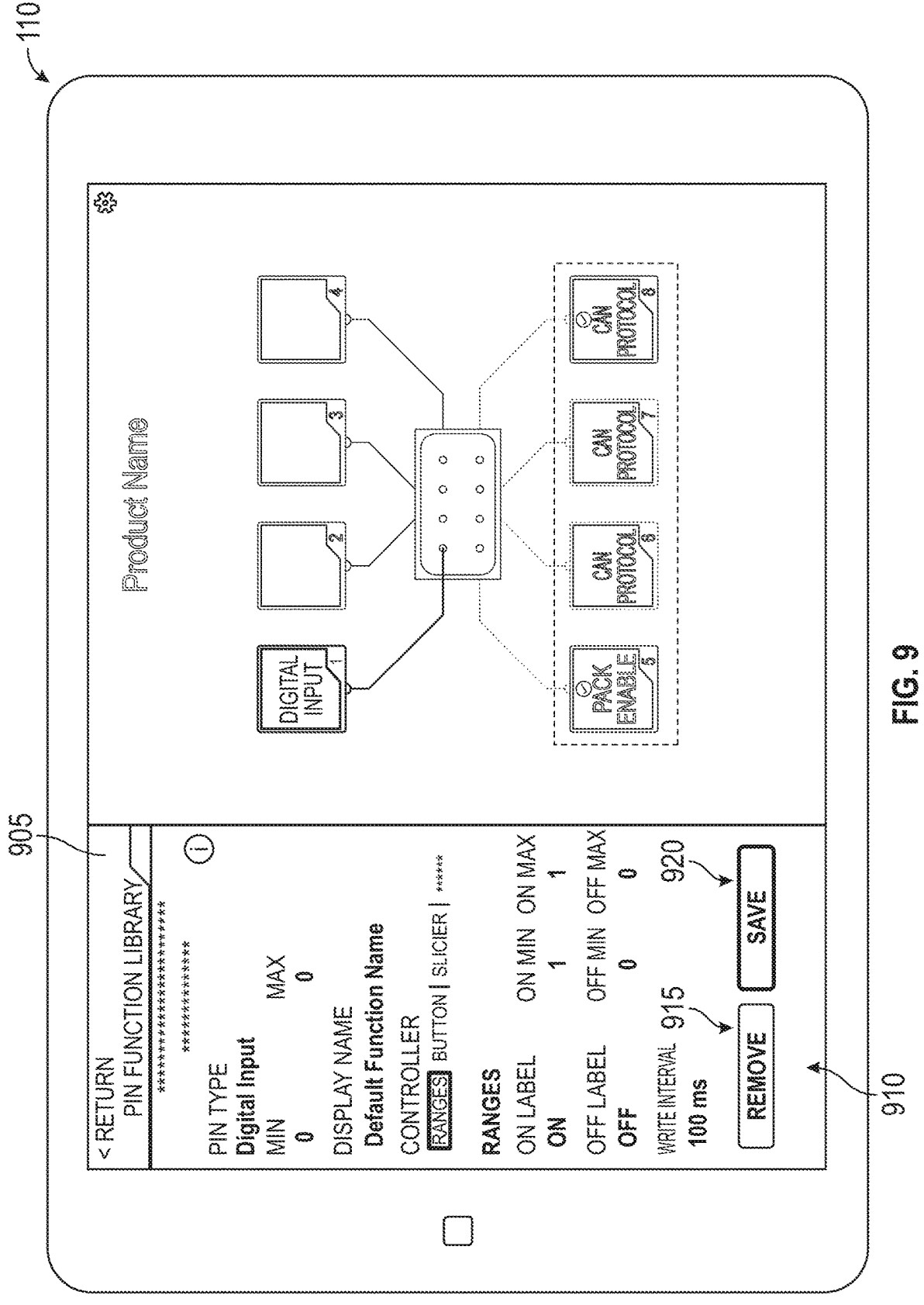
FIG. 9 is a front view of a user interface for entering options of the pin function for programmable data pins on the management system.

Referring now specifically to FIG. 9, in response to the selection of one of the available options for pin function on user interface 805, the mobile device 110 may display user interface 905, depicting options for the pin function of the data pin on the management system, according to an exemplary embodiment. For example, if digital input is selected as the function of the data pin chosen on the map of data pins 715, input options window 910 is shown. The input options window 910 may include several inputs that correspond with the digital input function, such as a display name, a minimum value, a maximum value, a type of controller (e.g., a switch, button, slider, stepper), on and off labels, on and off minimum values, on and off maximum values, and a write interval (e.g., 100 ms). The write interval may be the amount of time in between transmitting the data from the digital input data pin to a cloud of an IoT system. The user interface 905 also includes an activatable button 915 to remove the selection of the data pin function and an activatable button 920 to save the selection of the data pin function (e.g., digital input, battery pack enable, etc.).

Figure 10:
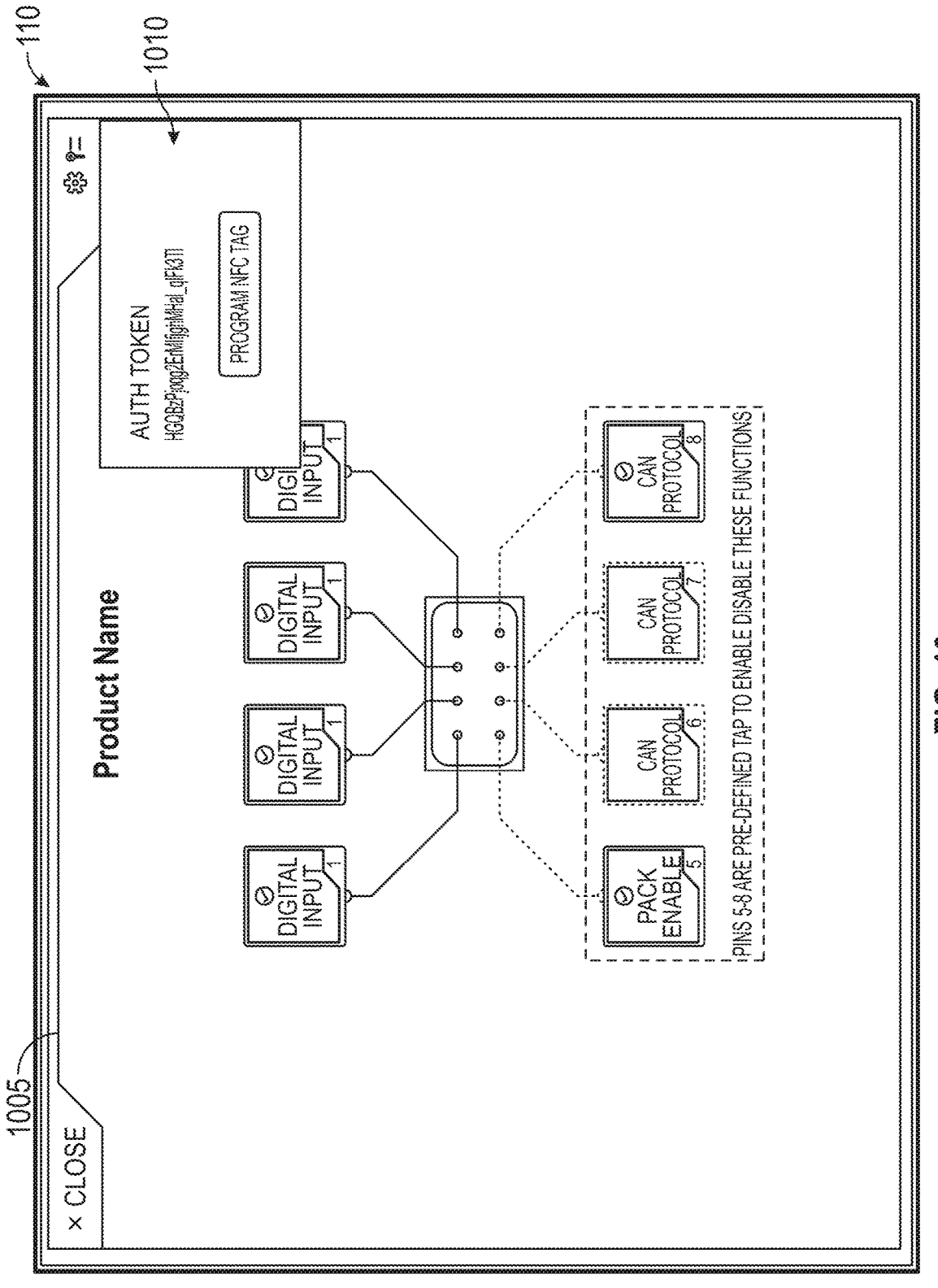
FIG. 10 is a front view of a user interface for programming an NFC tag after a pin function has been chosen for each data pin in the management system.
Figure 11:
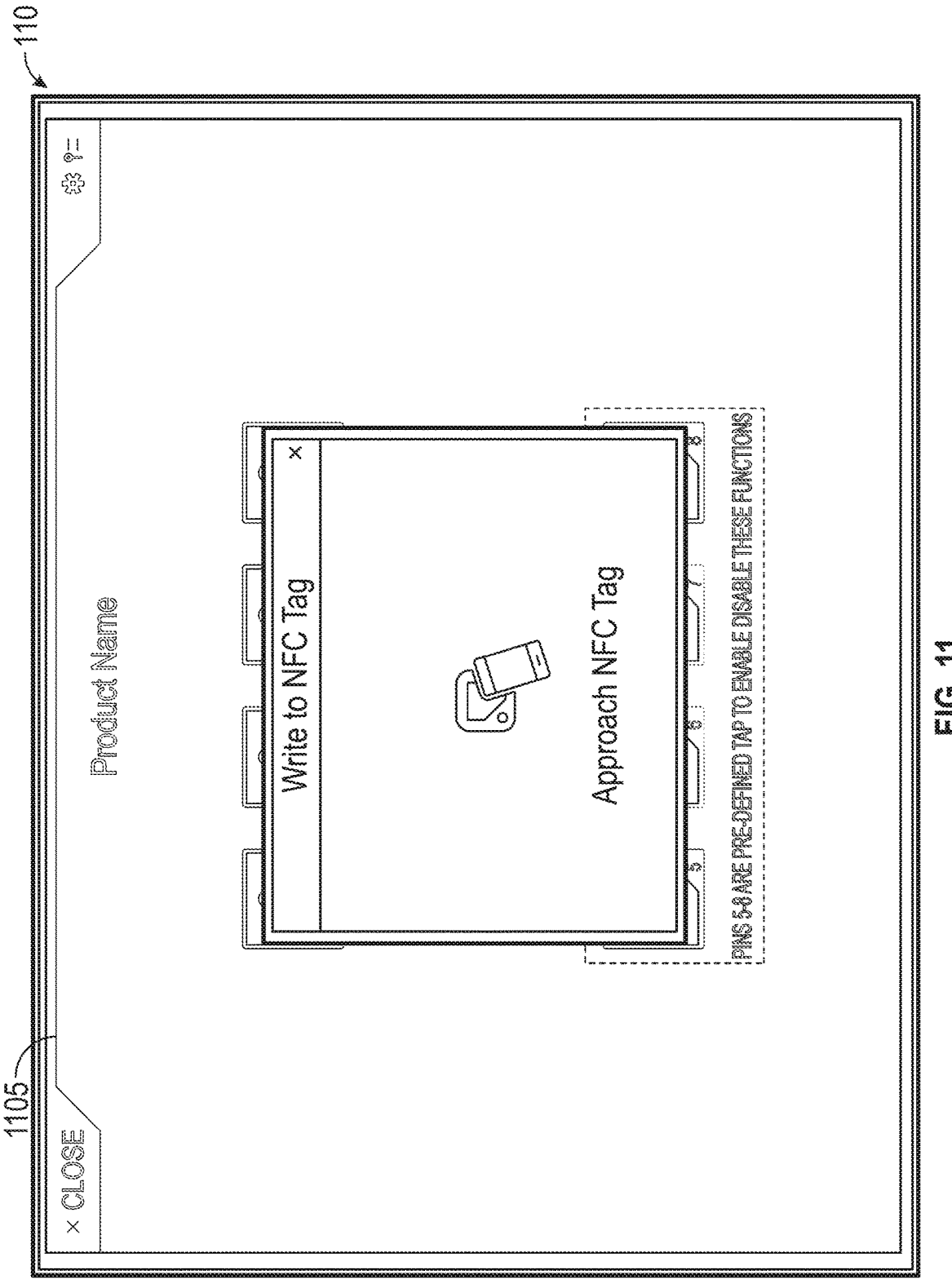
FIG. 11 is a front view of a user interface depicting an instruction for writing the data pin functions to the NFC tag on the management system.

Referring to FIG. 10 with reference to FIGS. 1A-1C, a user interface 1005 for programming an NFC tag 134 after a pin function has been chosen for each data pin is shown, according to some embodiments. The user interface 1005 shows the selections for the data pin functions and a window for authorizing the programming of an NFC tag 134 for an equipment interface 132. In some embodiments, if a user enters an incorrect input for the authorization token more than a predetermined amount of times (e.g., three attempts), the management system 101 may lock for a time interval. The activatable button 1010 may be selected to program the NFC tag 134 for the functions chosen for the data pins to configure the new product. In response to the selection of activatable button 1010, user interface 1105 (FIG. 11) may be displayed on the mobile device 110. The user interface 1105 may include instructions to a user, such as an OEM, to bring the mobile device 110 within a certain distance of the NFC tag 134. In some embodiments, the user interface 1105 shows the processing of writing to the NFC tag 134 and a status notification once the writing to the NFC tag 134 of the programmable data pin functions to configure a new product is completed. After the completion of writing to the NFC tag 134, the management system may allow a user to view the newly configured product in the "My Items" tab (e.g., such as shown in user interface 405 (FIG. 4)). The management system may also provide an activatable button to return to a user interface similar to user interface 1005 (FIG. 10) to change the configuration of the data pins, test the new product and log data, change settings of the product (e.g., product name, product description, etc.), program another NFC tag 134 for the product, and/or view records of which products have been created with options in an upper right hand corner of the user interface 1005. In other embodiments, instead of writing the functions of the programmable data pins to an NFC tag 134, the data pins are programmed by scanning a barcode, CAN communications, RS485 communications, or a USB connection, for example.

Figure 12:
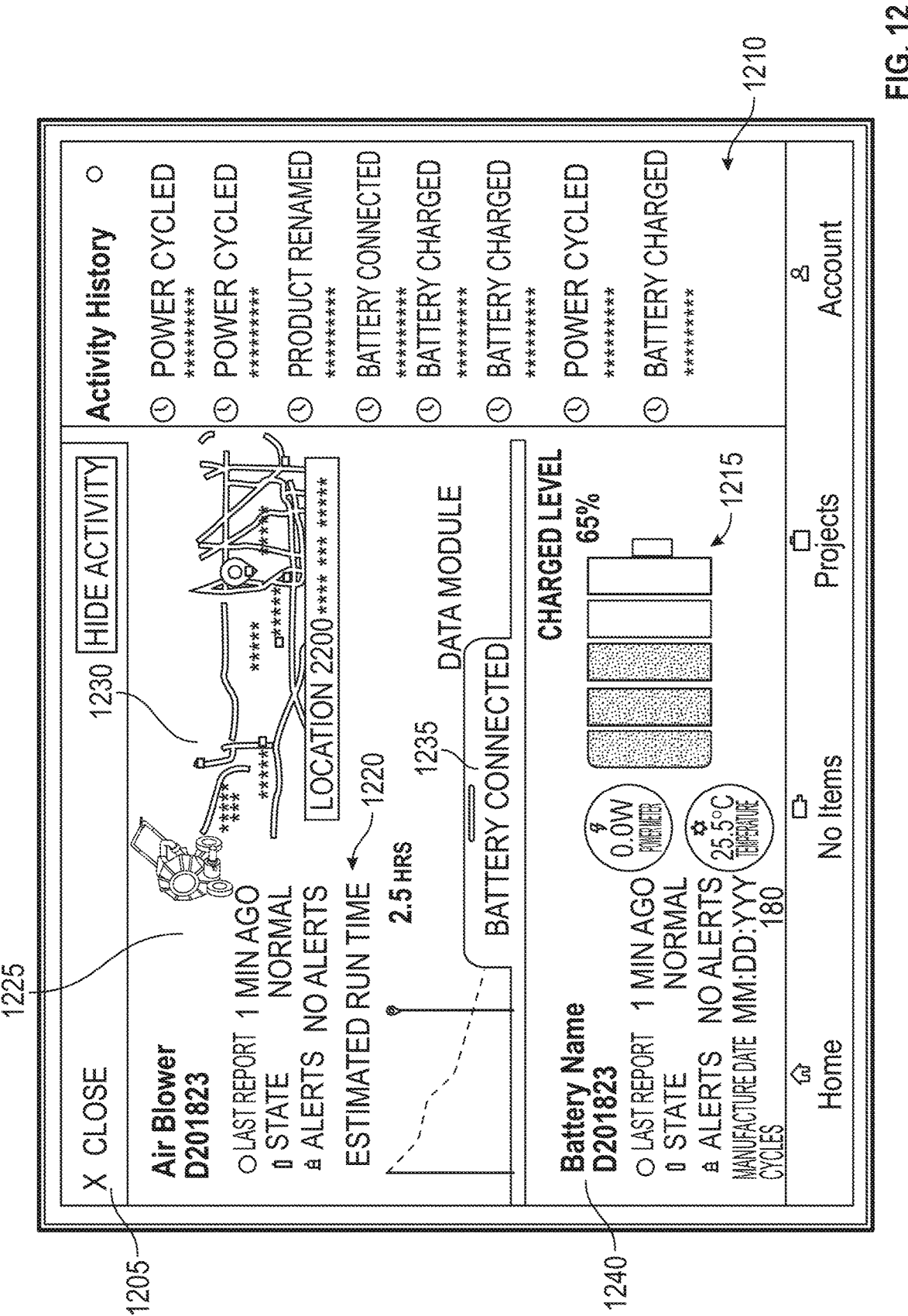
FIG. 12 is a front view of a user interface displaying product information and activity history of a product on the management system.

Referring now to FIG. 12 a user interface 1205 displaying product/equipment information and activity history of a product or piece of equipment 105 on the management system 101 is shown, according to some embodiments. The user interface 1205 may be displayed on the mobile device 110 in response to the selection of one of the configured and tracked items on the "My Items" tab of the management system 101, such as shown in FIG. 4. For example, the selection of the air blower item in the items list 415 may cause the management system to show a user the tracked details of the air blower. The user interface 1205 includes an activity history window 1210, a battery charge level 1215, an estimated run time 1220, a summary window 1225, a location window 1230, a battery tab 1235, and a battery summary window 1240, in some embodiments. The battery tab 1235 may be selectable to further details on a battery connected to the piece of power equipment (e.g., the air blower being monitored by the management system 101). The activity history window 1210 may include a list of operations related to the air blower, such as power cycled, product renamed, battery connected, battery charged, battery empty, detected malfunction, etc. The list of operations shown in the activity history window 1210 can also include a time stamp for each activity, such as a date, time, or number of days that have passed since the activity occurred. In some embodiments, an option to clear the activity history is presented in the activity history window 1210.

The item summary window 1225 may include general information on the power equipment. For example, the information in the item summary window 1225 includes, but is not limited to, the name of the product (e.g., air blower, lawn mower, pressure washer, etc.), the product ID number (e.g., a serial number for the item), an image of the product, the time a report was last generated for the product, a state of the product (e.g., normal, healthy, at risk, at fault, charging, etc.), and a number of current alerts for the product. In some embodiments, any alerts generated for the product are displayed in the activity history window 1210. The location window 1230 may show a tracked location of the power equipment. In some embodiments, the location of the power equipment is detected by a GPS sensor in a management circuit 102 of a connected battery pack 100 that is then transmitted via the network interface 104 of the battery pack 100 to a cloud data system of the OEM. The estimated run time window 1220 may display an amount of time remaining that the equipment can operate of the connected battery. An amount of time remaining may be displayed, along with an indicator showing the use of the equipment over time. The modules shown in user interface 1205 can be configured by an operator (e.g., an OEM) when configuring a new product for the battery management system.

Figure 13:
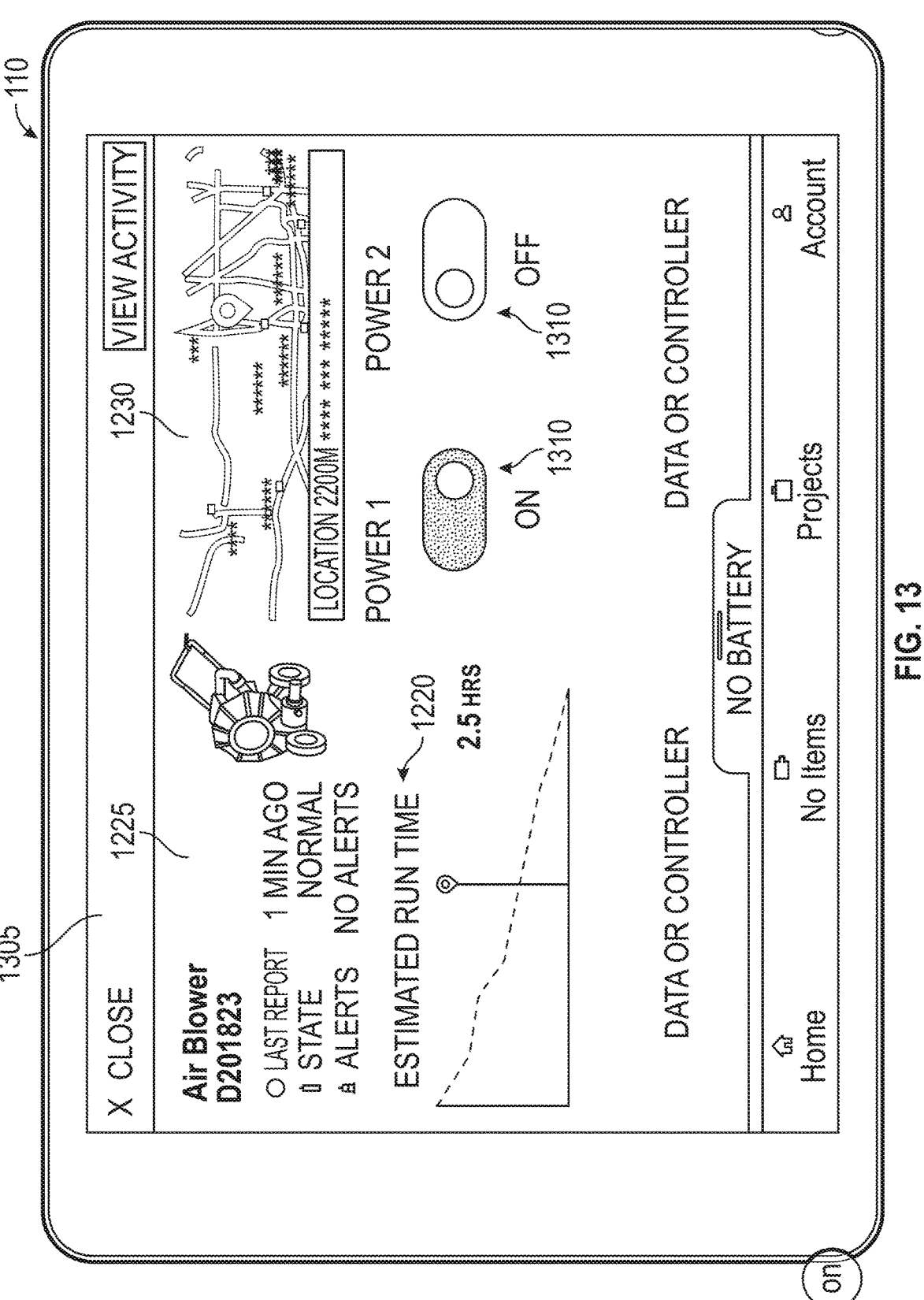
FIG. 13 is a front view of a user interface showing information for monitored power equipment on the management system.

FIG. 13 is another user interface 1305 showing information for monitored power equipment on the management system, according to an exemplary embodiment. The user interface 1305 shows an additional embodiment of the type of data that may be displayed for tracked power equipment. For example, the tracked air blower in user interface 1305 is not connected to a battery. The user interface 1305 includes the same information modules as user interface 1205, such as item summary window 1225, location window 1230, and estimated run time window 1220, with an additional data module to control the power of the air blower. As such, an OEM may be able to turn off tracked power equipment without having to interface directly with the power equipment. In other embodiments, the toggle buttons of the power button 1310 is instead a slider that may allow an operator to alter the amount of power the equipment is using during operation (e.g., by dimming the brightness of a light tower). Once a battery is physically and electrically coupled to the equipment (e.g., the air blower shown in summary window 1225), power details for the connected battery pack 100 may be displayed by the management system 101.

Figure 14:
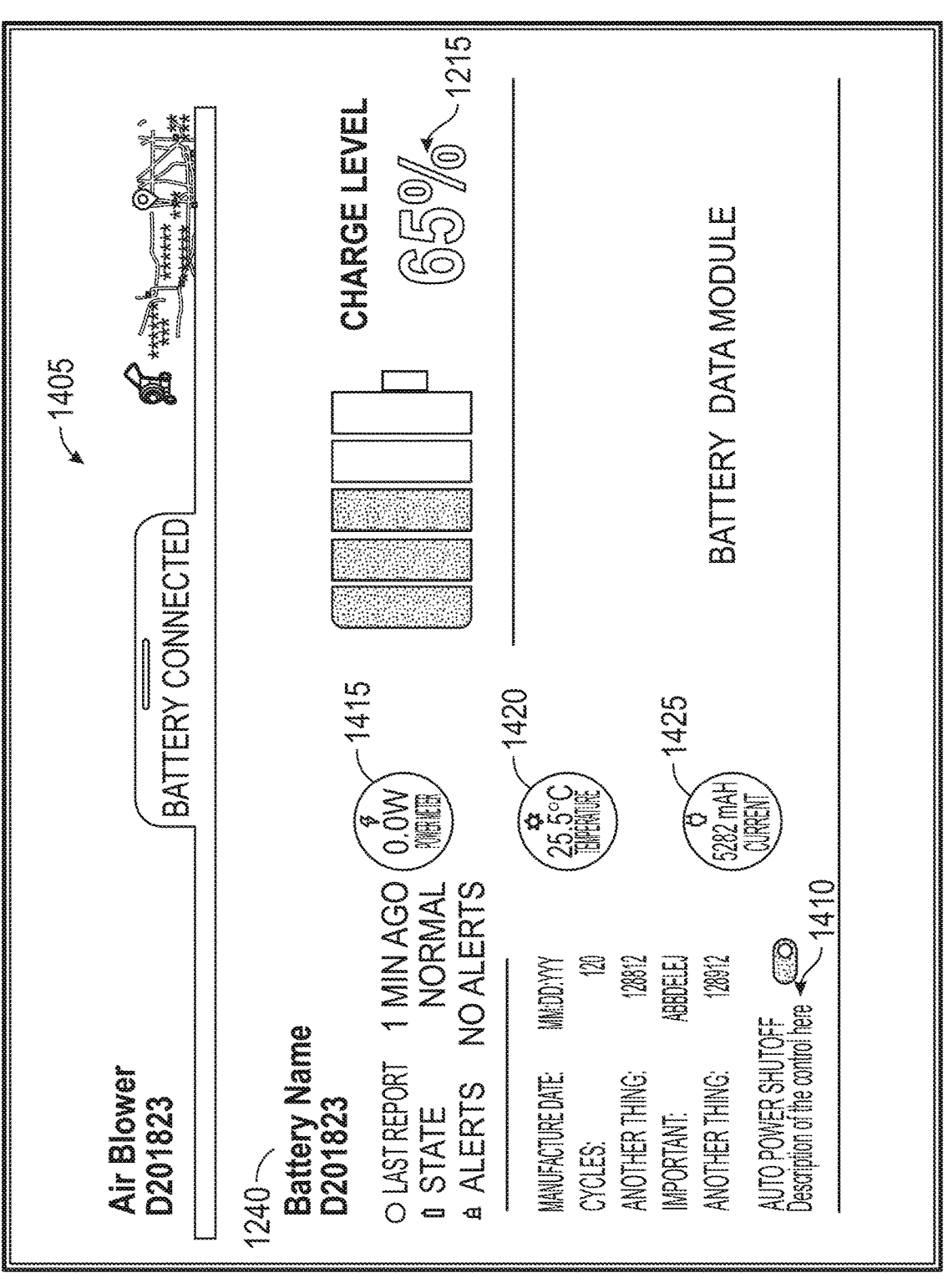
FIG. 14 is a zoomed-in view of a portion of a user interface depicting information of a battery connected to a piece of power equipment on the management system.

Referring to FIG. 14, a zoomed-in view 1405 of a portion of a user interface depicting details of a connected battery pack 100 are shown, according to some embodiments. For example, the view 1405 may be displayed on the mobile device 110 when the connected battery tab 1235 is selected on user interface 1205. The view 1405 is shown to include the battery charge level 1215 of a connected battery and battery summary window 1240. The battery summary window 1240 may include a power meter 1415, a temperature measurement 1420, and current measurement 1425 of a battery physically and electrically connected to a piece of outdoor power equipment. The battery summary window 1240 also includes an auto shutoff option 1410. As such, an OEM may be able to wirelessly turn off a battery to stop operation of the power equipment coupled to the battery pack 100. Additional information that may be included in the battery summary window 1240 includes, but is not limited to, a time of the last report, a state of the battery, number of alerts for the battery, a manufacture date, a number of charging cycles, and so on. The power meter 1415, temperature measurement 1420, and current measurement 1425 may be determined by sensors in a battery pack 100. The measurements from the battery pack 100 may be communicated to the management system using a cloud system by a communication interface (e.g., network interface 104) of the battery pack 100.

In some embodiments, the user interface 1405 displays data received from the battery packs 100 remotely. The user interface 1405 displays, among other data, information relating to battery runtime, battery health, and battery location (e.g., using a Global Positioning System on the battery pack 100). The user interface 1405 may allow an employee and/or operator to remotely lock out the battery pack 100 such that the battery pack 100 will not operate to provide power. In this way, the battery packs 100 can be tracked and shut down if a theft is determined to likely have occurred. In addition, using remote tracking and operation, an employee of a rental company can lock out the battery pack 100 when a rental period expires. The operator of the battery pack 100 can then be prompted via an application on their own mobile device whether they would like to extend the rental period and can do so remotely. By interacting with an application displayed on an operator's mobile device, the operator can also preemptively extend the rental period, transmitting a notification to the rental company and/or employee of the rental company.

The user interface 1405 shows battery pack charge and health data. An operator or employee of a rental service may use the battery management system 101, via the user interface 1405, to track the battery charge levels across multiple battery packs 100 to determine which of the battery packs 100 may be fully charged and thus, ready to use and/or rent out. In addition, the battery packs 100 can be chosen for certain pieces of equipment based on various parameters associated with the battery packs 100, such as State of Health (SoH), State of Charge (SoC), the amount of charge on the battery, etc. For example, a piece of equipment that requires less battery charge may be able to use a battery pack 100 with less charge than a piece of equipment that requires a fully charged battery for practical use. A rental company may track the charge of the battery packs 100 to determine whether to rent out a particular battery pack 100 to a customer based on which equipment the operator desires to power using the battery pack 100. The user interface 1405 may also display other health characteristics, such as which battery packs 100 may be failing to charge properly. In some embodiments, when the amount of charge on the battery pack is below a certain threshold (e.g., 15%), a warning light is displayed on a user interface of the battery pack 100 or the mobile device 110. In other embodiments, if the charge on the battery pack 100 is below a threshold level, an alert may be generated and displayed on the user interface 1405. A user can program, using the management system and programmable data pins, at what charge level a warning light turns on or at what charge level a notification is generated. The user interface 1405 may also display throttle data, for example, how quickly the connected battery pack 100 drains if the equipment 105 is operated at full throttle for a certain duration of time.

Figure 15:
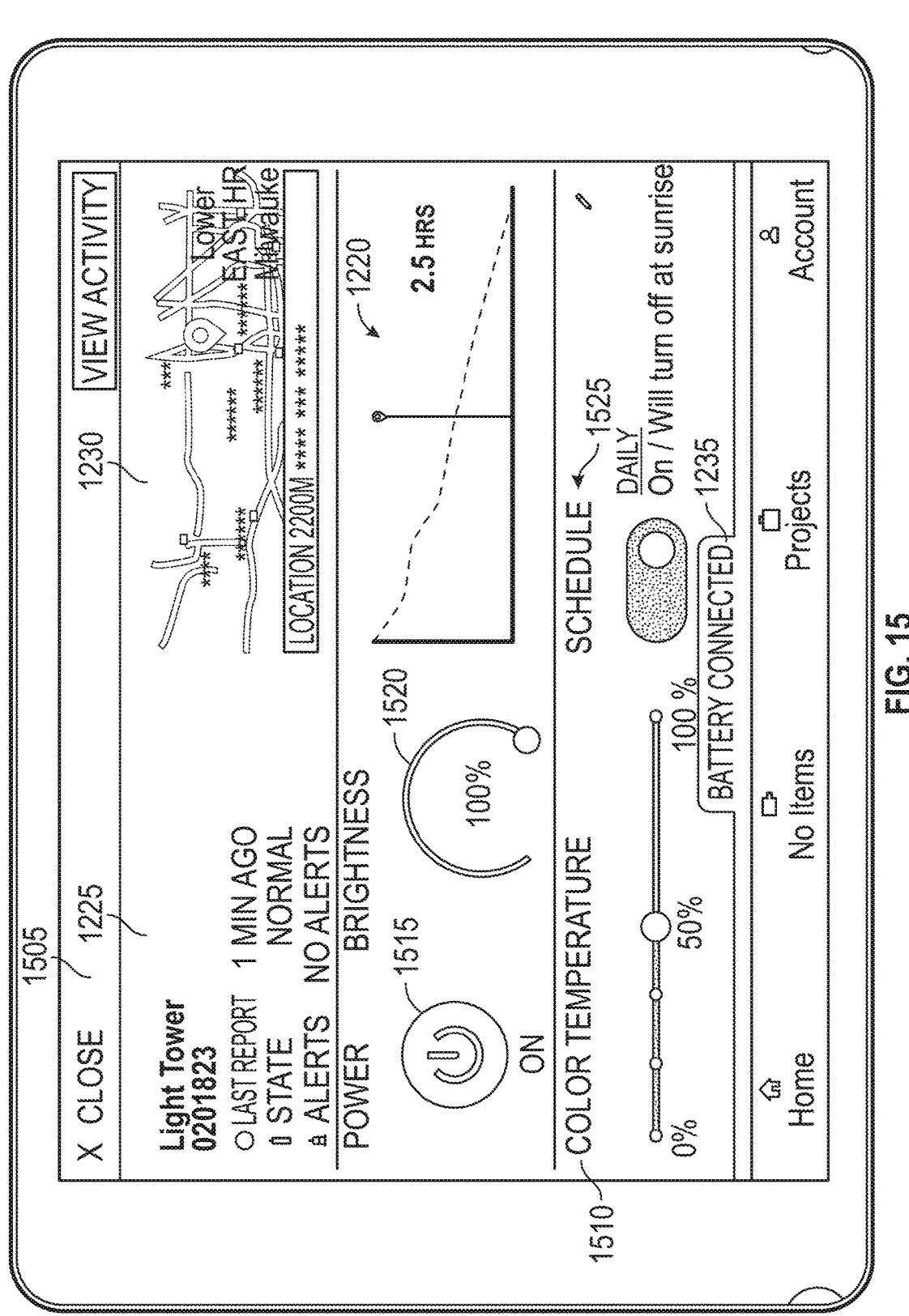
FIG. 15 is a front view of another user interface displaying information for monitored power equipment on the management system.

FIG. 15 shows another user interface 1505 for displaying information on monitored power equipment via the mobile device 110, according to one embodiment. In one embodiment, the item summary window 1225 includes information on a tracked piece of equipment, such as a light tower, that is being rented out to a customer. The location window 1230 may display where the light tower is currently in operation. The management system may receive the location of the light tower via a network connecting a fleet of power equipment, such as a cloud system (e.g., fleet management system 114 shown in FIG. 1A). The user interface 1505 also includes a color temperature window 1510, an activatable power button 1515, a brightness window 1520, an estimated run time window 1220, and a schedule window 1520. The data modules shown in the user interface 1505 may be configured by a user to control different functionalities of the power equipment. For example, a user (e.g., an OEM testing the power equipment or a customer renting the power equipment) may change the brightness of a light tower using the slider in the brightness window 1520. In another example, the temperature of the light given by the light tower may be tested using the color temperature window 1510. The schedule window 1510 may include an activatable toggle switch to operate the light tower on a predetermined schedule, as described further below with reference to FIG. 16. In other embodiments, different data and control modules are included in the user interface 1505, depending on the wants and needs of a customer using the product or an OEM testing the product.

Figure 16:
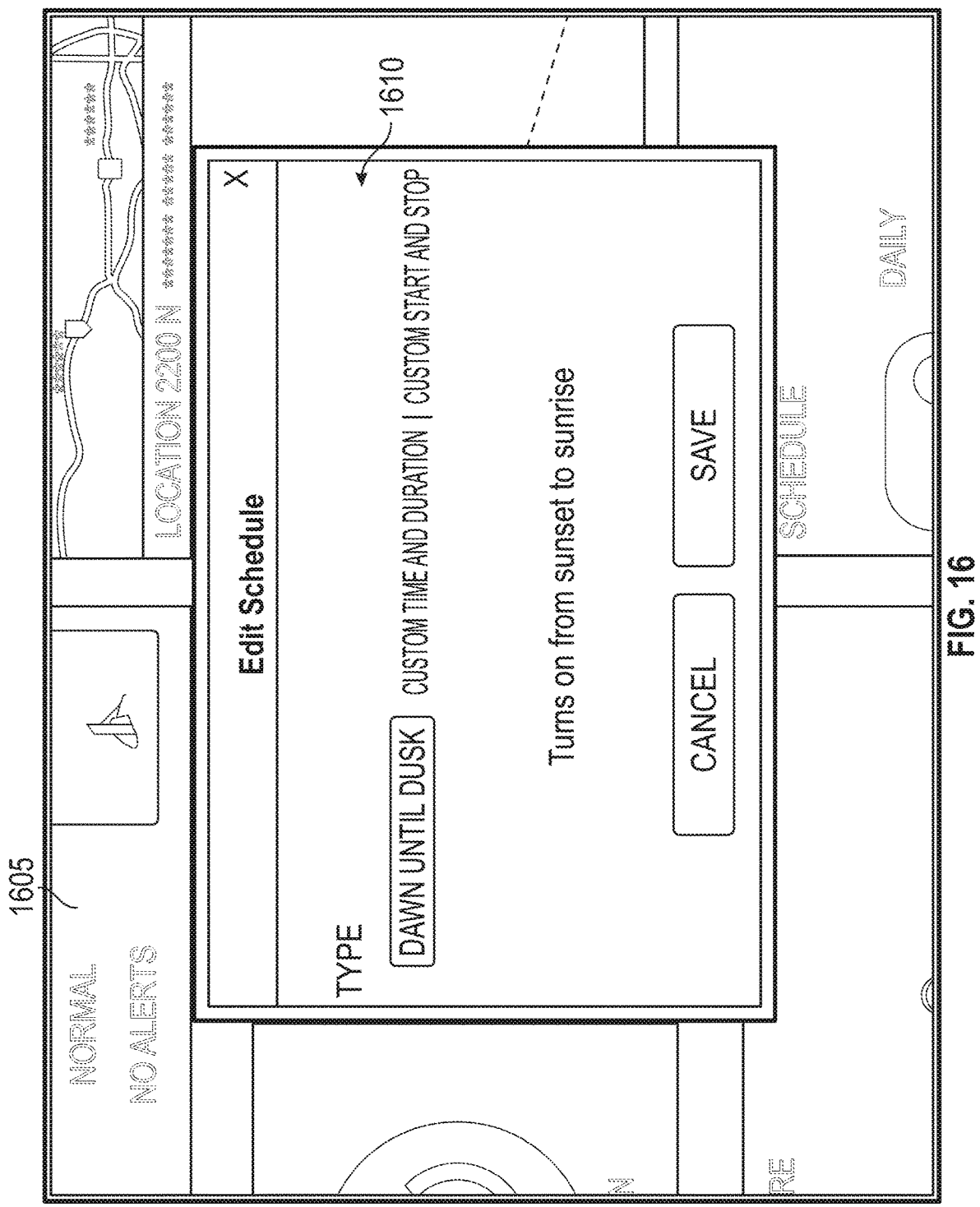
FIG. 16 is a zoomed-in view of a portion of a user interface for editing a schedule of operating power equipment on the management system.

Referring now to FIG. 16, a zoomed-in view 1605 of a portion of a user interface for editing a schedule of operating power equipment is shown, according to one embodiment. The edit schedule window 1610 may be configured to alter an operation schedule of a piece of power equipment. In some embodiments, different selections of a type of schedule may be provided, such as "Dawn Until Dusk," "Custom Time and Duration," and "Custom Start and Stop." For example, if a user selects the option "Dawn Until Dusk" in the edit schedule window 1610, the piece of power equipment (e.g., a light tower) connected to the battery pack 100 may turn on from sunset to sunrise. In other embodiments, a user may enter a time for the equipment to turn on and/or off, or a duration of time to run the equipment. As such, time a user would take to go to a jobsite or testing location to turn on and off the equipment can be saved, since the user may accomplish these controls remotely with the battery management system described herein.

Figure 17:
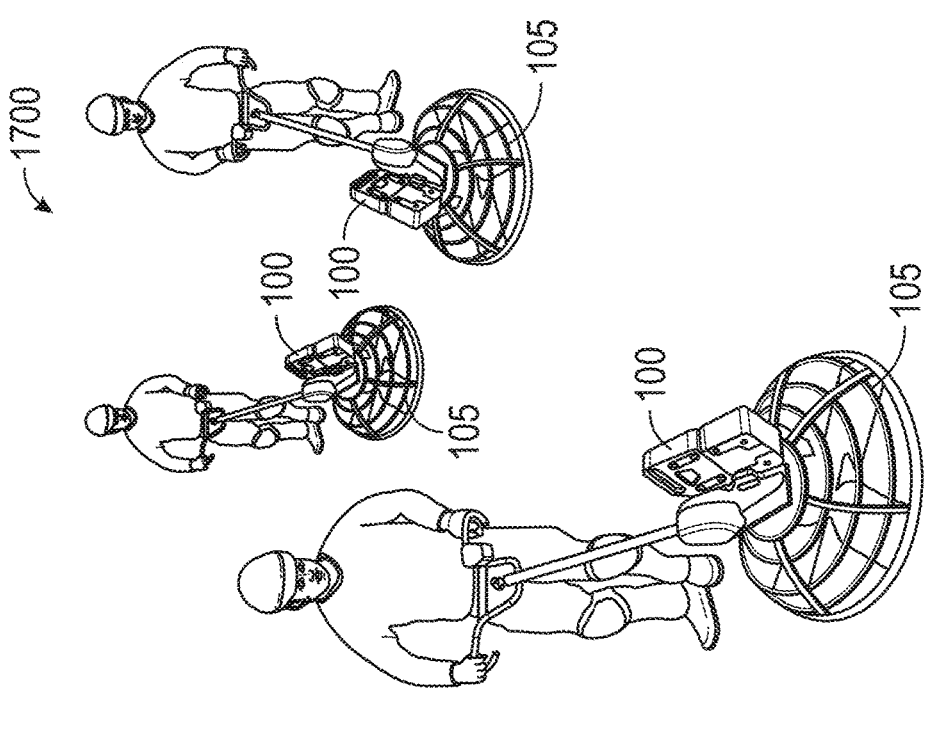
FIG. 17 is a front view of the battery management system of FIG. 1 in use with a fleet of equipment.
Figure 17:
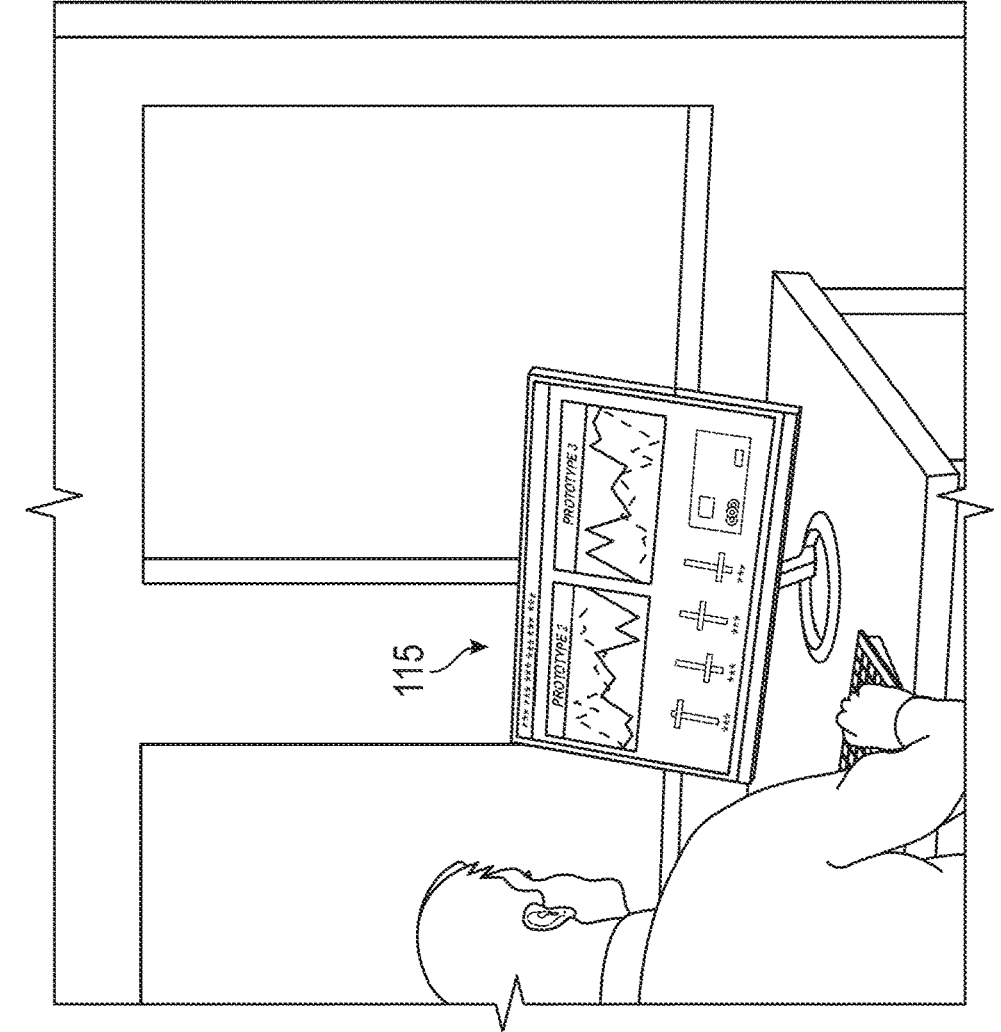

Referring now to FIG. 17 with reference to FIGS. 1A-1C, a system 1700 of the battery packs 100 coupled to equipment 105 in a fleet of outdoor power equipment is shown, according to one embodiment. The battery packs 100 are communicably coupled with a remote management system (e.g., management system 101) including a dashboard 115 presented on an interface of a computing device (e.g., a desktop computer, mobile device 110). The battery packs 100 may be part of an IoT system, in some embodiments. The battery packs 100 may not include cellular communication capabilities, and as such, may require a separate gateway (e.g., a dedicated gateway or a mobile gateway) to communicate via a network. In other embodiments, the battery packs 100 include cellular communication capabilities and act as gateways, such as an IoT gateway. As such, data communication between the battery pack 100, mobile devices 110, and other computing devices, may be facilitated via network, such as a Wi-Fi network. The network may include cellular transceivers, the Internet, a local area network (LAN), a wide area network (WAN). The network between the battery packs 100, mobile devices 110, equipment 105 (e.g., via NFC tags 134 on interfaces 132 of equipment 105) and other computing devices may be facilitated by short and/or long range communication technologies. The short and/or long range communication technologies may include, but are not limited to, Bluetooth transceivers, Bluetooth beacons, RFID transceivers, NFC transceivers, Wi-Fi transceivers, cellular transceivers, wired network connections, etc. As such, in one embodiment, the communication between mobile devices 110, other computing devices (e.g., the desktop computer displaying dashboard 115), and the battery packs 100 can be facilitated by and connected to a cloud-based system via RFID and Wi-Fi connections on the battery packs 100. In other embodiments, the communication can be facilitated by and connected to a cloud-based system via Wi-Fi only. In another embodiment, the communication can be facilitated by and connected to a cloud-based system via cellular transceivers. In yet another embodiment, the communication can be facilitated by and connected to a cloud-based system via Bluetooth and cellular transceivers. In all such embodiments, the cloud-based system can be made accessible to a third party, such as a consumer and/or rental company (e.g., an OEM company).

The various connectivity environments described herein allow for communication across battery packs 100 and across pieces of equipment through integration of the communication capabilities in the battery and not necessarily the equipment itself. Accordingly, the battery packs 100 described herein are standardized and can be used across all platforms, independent of the type of equipment the battery packs 100 are powering. The battery packs 100 may also beneficially receive over the air software updates from a cloud-based, IoT system. Additionally, the use of IoT allows for integration of data directly into usage and analytics systems for companies (e.g., an OEM company) to better understand how the use of the battery packs 100 affect their business and/or how to manage the use of battery packs 100 or certain pieces of equipment.

Furthermore, the IoT system on the product side allows runtime data, location data, configuration data, and other usage data of the battery packs 100 and power equipment 105 to be stored in a cloud of the management system 101. As such, memory storage and security of the data can be improved. The IoT system may verify the data in the cloud with the associated data from each battery pack 100. The IoT system may help track which battery packs 100 are coupled to power equipment 105 and which battery packs 100 are not currently connected to equipment (e.g., connected to a charging station or a portable charger). Accordingly, an OEM can determine what battery packs 100 are available to rent out to other users. In addition, using the battery pack 100 and various connectivity environments described herein, operation and management of products, such as light towers, pumps, etc., can be accomplished remotely. In a rental system, the use of IoT allows for disablement and enablement of battery packs 100 and/or equipment based on rental time. For example, if a user has used the battery pack 100 for longer than the allotted rental time, the battery pack 100 may be powered down remotely (e.g., via auto shutoff option 1410 (FIG. 14)). In this way, rental companies save time on tracking the location of and usage of battery packs 100.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

It should be noted that certain passages of this disclosure can reference terms such as "first" and "second" in connection with side and end, etc., for purposes of identifying or differentiating one from another or from others. These terms are not intended to merely relate entities (e.g., a first side and a second side) temporally or according to a sequence, although in some cases, these entities can include such a relationship. Nor do these terms limit the number of possible entities (e.g., sides or ends) that can operate within a system or environment.

The terms "coupled" and "connected" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

What is claimed is:

1. A battery pack comprising:
   a housing;
   a plurality of rechargeable battery cells positioned within the housing;
   a connection interface in communication with the plurality of rechargeable battery cells, the connection interface including a plurality of data pins, a positive terminal, and a negative terminal;
   a near-field communication (NFC) reader positioned within the housing;
   a battery management system in communication with the NFC reader and configured to receive information from the NFC reader including an NFC tag identification, retrieve stored parameters corresponding to the NFC tag identification, and configure at least one of the plurality of data pins based upon the stored parameters corresponding to the NFC tag identification; and
   a communication gateway in communication with the battery management system, the communication gateway configured to transmit and receive information via a communication protocol having a frequency exceeding 14 MHz;
   wherein the battery management system is configured to monitor operational parameters of the rechargeable battery cells and data received through the plurality of data pins and transmit the operational parameters of the rechargeable battery cells and data received through the plurality of data pins over the communication protocol.

2. The battery pack of claim 1, wherein the data pins are reconfigurable to receive a first data set when the NFC reader provides a first NFC tag identification to the battery management system and to receive a second data set when the NFC reader provides a second NFC tag identification to the battery management system different than the first NFC tag identification.

3. The battery pack of claim 2, wherein the first NFC tag identification corresponds to a first class of power equipment and the second NFC tag identification corresponds to a second class of power equipment.

4. The battery pack of claim 2, wherein when the NFC reader provides the first NFC tag identification to the battery management system, the data pins are configured to communicate a command from a piece of power equipment to the battery management system, and wherein upon receiving the command, the battery management system adjusts a position of a contact to begin or to discontinue electrical power transmission between the rechargeable battery cells and the positive terminal and negative terminal.

5. The battery pack of claim 2, wherein the first data set includes at least one of a blade speed, a temperature, a power on command, a power off command, a health status, or a number of blade rotations from power equipment associated with the first NFC tag identification.

6. The battery pack of claim 2, wherein the data pins are configured to transmit a third data set when the NFC reader provides the first NFC tag identification to the battery management system, and wherein the data pins are configured to transmit a fourth data set when the NFC reader provides the second NFC tag identification to the battery management system.

7. The battery pack of claim 6, wherein the third data set includes at least one of battery life, battery health, battery status, or battery temperature.

8. The battery pack of claim 1, wherein the battery management system, the communication gateway, and the NFC reader form an internet of things (IoT) module upon the battery pack, the IoT module being able to communicate externally from the battery pack using the plurality of data pins, the NFC reader, and the communication protocol, and wherein the IoT module is coupled to a management circuit that monitors the operational parameters of the rechargeable battery cells.

9. A battery pack comprising:
a housing;
a plurality of rechargeable battery cells positioned within the housing;
a connection interface in communication with the plurality of rechargeable battery cells, the connection interface including an electrical connector having a positive terminal, a negative terminal, and a plurality of data pins;
a near-field communication (NFC) reader positioned within the housing;
a battery management system in communication with the NFC reader and configured to receive information from the NFC reader including an NFC tag identification, retrieve stored parameters corresponding to the NFC tag identification, and configure at least one of the plurality of data pins based upon the stored parameters corresponding to the NFC tag identification; and
a communication gateway in communication with the battery management system, the communication gateway configured to transmit and receive information via Bluetooth;
wherein the battery management system is configured to monitor operational parameters of the rechargeable battery cells and data received through the plurality of data pins and transmit the operational parameters of the rechargeable battery cells and data received through the plurality of data pins over Bluetooth.

10. The battery pack of claim 9, wherein the plurality of data pins are reconfigurable in response to receiving a signal from a mobile device communicating via Bluetooth.

11. The battery pack of claim 9, wherein the battery management system is further configured to monitor at least one of a health status or an operational status of power equipment coupled to the connection interface using information received via at least one of the plurality of data pins.

12. The battery pack of claim 11, wherein the battery management system is configured to monitor at least one of a blade speed of the power equipment, a temperature of the power equipment, or a power requesting status of the power equipment.

13. The battery pack of claim 9, wherein the data pins can be configured to function as a Controller Area Network (CAN), a battery pack enable, a digital input, and/or an analog input.

14. The battery pack of claim 9, wherein upon configuring the at least one of the plurality of data pins based upon the stored parameters corresponding with the NFC tag identification, at least one input on the battery pack is configured to adjust an operational parameter of the power equipment associated with the NFC tag identification.

15. The battery pack of claim 9, wherein upon configuring the at least one of the plurality of data pins based upon the stored parameters corresponding with the NFC tag identification, at least one input on the battery pack is configured to adjust one of a current input limit and a current output limit.

16. A battery pack comprising:
a housing;
a plurality of rechargeable battery cells positioned within the housing;
a connection interface in communication with the plurality of rechargeable battery cells, the connection interface including a plurality of data pins, a positive terminal, and a negative terminal;
a near-field communication (NFC) reader positioned within the housing;
a battery management system in communication with the NFC reader and configured to receive information from the NFC reader including an NFC tag identification, retrieve stored parameters corresponding to the NFC tag identification, and configure at least one of the plurality of data pins based upon the stored parameters corresponding to the NFC tag identification; and
a communication gateway in communication with the battery management system, the communication gateway configured to transmit and receive information via a communication protocol having a frequency exceeding 14 MHz;
wherein the battery management system is configured to monitor operational parameters of the rechargeable battery cells and data received through the plurality of data pins and transmit the operational parameters of the rechargeable battery cells and data received through the plurality of data pins over the communication protocol; and
wherein at least one of the plurality of data pins is configured to communicate with a Controller Area Network (CAN) bus and the battery management system.

17. The battery pack of claim 16, wherein the battery pack is configured to detect an attachment location of the battery pack using the at least one data pin configured to communicate with the CAN bus.

18. The battery pack of claim 17, wherein the battery management system adjusts one of a maximum output current and a maximum input current based upon the detected attachment location of the battery pack.

19. The battery pack of claim 16, wherein the battery pack is configured to receive software through the communication gateway, the software including at least one script that is configured to define a function of one of the plurality of data pins.

20. The battery pack of claim 19, wherein the software includes instructions to the battery management system, the instructions including an identification of at least one operational parameter of the battery pack to monitor and transmit through the communication gateway.

* * * * *